United States Patent
Moser et al.

(10) Patent No.: US 7,228,452 B2
(45) Date of Patent: Jun. 5, 2007

(54) TRANSPARENT CONSISTENT SEMI-ACTIVE AND PASSIVE REPLICATION OF MULTITHREADED APPLICATION PROGRAMS

(75) Inventors: Louise E. Moser, Santa Barbara, CA (US); Peter M. Melliar-Smith, Santa Barbara, CA (US)

(73) Assignee: Availigent Inc., San Jose, CA (US)

( * ) Notice: Subject to any disclaimer, the term of this patent is extended or adjusted under 35 U.S.C. 154(b) by 705 days.

(21) Appl. No.: 10/400,137

(22) Filed: Mar. 25, 2003

(65) Prior Publication Data

US 2004/0078618 A1    Apr. 22, 2004

Related U.S. Application Data

(60) Provisional application No. 60/367,615, filed on Mar. 25, 2002, provisional application No. 60/367,616, filed on Mar. 25, 2002.

(51) Int. Cl.
*G06F 11/00* (2006.01)
(52) U.S. Cl. .................. 714/4; 714/6; 714/12
(58) Field of Classification Search ................... 714/12
See application file for complete search history.

(56) References Cited

U.S. PATENT DOCUMENTS

| | | | | |
|---|---|---|---|---|
| 4,718,002 A | | 1/1988 | Carr | |
| 5,257,381 A | * | 10/1993 | Cook | ........................ 719/318 |
| 5,577,261 A | | 11/1996 | Harinarayan et al. | |
| 5,621,885 A | | 4/1997 | Del Vigna, Jr. | |
| 5,794,034 A | * | 8/1998 | Harinarayan et al. | ........ 718/102 |
| 5,799,146 A | * | 8/1998 | Badovinatz et al. | ............ 714/4 |
| 5,802,265 A | * | 9/1998 | Bressoud et al. | ............. 714/11 |
| 5,941,999 A | * | 8/1999 | Matena et al. | .................. 714/6 |
| 5,956,489 A | * | 9/1999 | San Andres et al. | ......... 709/221 |
| 5,968,185 A | | 10/1999 | Bressoud et al. | |
| 6,332,200 B1 | | 12/2001 | Meth et al. | |
| 6,463,454 B1 | | 10/2002 | Lumelsky et al. | |

(Continued)

OTHER PUBLICATIONS

Stallings, William; Operating Systems, Third Edition, published 1998, pp. 72, 276-277.*
Microsoft Computer Dictionary, Fifth Edition, published 2002, p. 182.*

(Continued)

*Primary Examiner*—Scott Baderman
*Assistant Examiner*—Joshua Lohn
(74) *Attorney, Agent, or Firm*—John P. O'Banion

(57) ABSTRACT

A system and method for replicating a multithreaded application program using a semi-active or passive replication strategy, wherein the application program executes under the control of an operating system having a thread library. The method comprises piggybacking mutex ordering information at the Primary replica onto regular multicast messages specifying the order in which threads in the Primary replica have been granted their claims to mutexes; and receiving the multicast messages at a Backup replica containing the mutex ordering information which determines the order in which threads in the Backup replica are granted mutexes. Thread library interpositioning is preferably utilized to intercept calls to functions in the operating system's thread library, so that the system and method of the invention may be implemented transparently. The invention enforces strong replica consistency without the need to count instructions, add significant messaging overhead, or modify application code.

118 Claims, 11 Drawing Sheets

U.S. PATENT DOCUMENTS

| | | | | |
|---|---|---|---|---|
| 6,539,446 B1 * | 3/2003 | Chan | | 710/200 |
| 6,574,750 B1 | 6/2003 | Felber et al. | | |
| 6,928,577 B2 * | 8/2005 | Moser et al. | | 714/4 |
| 2002/0032883 A1 * | 3/2002 | Kampe et al. | | 714/16 |
| 2002/0099973 A1 | 7/2002 | Moser et al. | | |
| 2005/0229035 A1 * | 10/2005 | Peleska et al. | | 714/12 |

OTHER PUBLICATIONS

Basile et al., Active Replication of Multithreaded Applications, Technical Report CRHC-02-01, University of Illinois at Urbana-Champaign, published 2002.*

Goldberg et al., Transparent Recovery of Mach Applications, published 1990.*

* cited by examiner

TRANSPARENT CONSISTENT SEMI-ACTIVE AND PASSIVE REPLICATION OF MULTITHREADED APPLICATION PROGRAMS

CROSS-REFERENCE TO RELATED APPLICATIONS

This application claims priority from U.S. provisional application Ser. No. 60/367,615 filed on Mar. 25, 2002, incorporated herein by reference, and from U.S. provisional application Ser. No. 60/367,616 filed on Mar. 25, 2002, incorporated herein by reference.

STATEMENT REGARDING FEDERALLY SPONSORED RESEARCH OR DEVELOPMENT

This invention was made with Government support under Grant No. 70NANBOH3015, awarded by the U.S. Department of Commerce, National Institute of Standards and Technology. The Government may have certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

REFERENCE TO A COMPUTER PROGRAM APPENDIX

Not Applicable

BACKGROUND OF THE INVENTION

1. Field of the Invention

The invention relates to software-based fault-tolerant computer systems and, in particular, to multithreaded application programs that are replicated using the leader-follower semi-active and passive replication strategies.

2. Description of Related Art

Fault-tolerant systems are based on entity redundancy (replication) to mask faults and, thus, to provide continuous service to their users. In software fault tolerance, the entities that are replicated are the application programs or parts thereof (processes, objects or components). A fundamental issue in the design and implementation of fault-tolerant systems is that of maintaining the consistency of the states of the replicas.

Distributed systems offer the opportunity for fault tolerance by allowing replicas of the application programs to be hosted on different computers (i.e., in different fault containment regions). In the client-server model of distributed computing, a client invokes a method of a server, typically hosted on a different computer, by receiving a request message containing that method invocation and by receiving a reply message from that server. To render an application fault-tolerant, the server is replicated but the client may also be replicated, particularly in multi-tier and peer-to-peer applications, where a process, object or component acts as both a client and a server.

Fault-tolerant systems support several different replication strategies including semi-active and passive replication, and variations thereof. In both semi-active and passive replication, one of the replicas is distinguished as the Primary replica and the other replicas are called the Backup replicas.

In semi-active replication, all of the replicas of a process, object or component execute each method invoked on the replicas. The Primary replica determines the order in which the methods and other operations are executed and communicates that order to the Backup replicas, which executes the methods and other operations in the same order. If the Primary replica makes a decision regarding a non-deterministic operation (such as the order in which access to a shared resource is granted), it communicates that decision to the Backup replicas which make the same decision. If the Primary replica fails, a Backup replica takes over as the Primary replica and starts making decisions that the other Backup replicas must follow.

In passive replication, only the Primary replica executes the methods invoked on the replicas. The state of the Primary replica (values of its variables or attributes) is checkpointed periodically or on demand, and the messages, methods and other operations after the checkpoint are logged. If the Primary replica fails, a Backup replica takes over as the Primary replica. The checkpoint is loaded into the Backup replica and the messages, methods and other operations after the checkpoint are replayed.

A challenging aspect of replication is to maintain strong replica consistency, as methods are invoked on the replicas and the states of the replicas change dynamically, and as faults occur. Strong replica consistency means that, for each method invocation or operation, for each data access within that method invocation or operation, the replicas obtain the same data values. Moreover, for each result, message sent or request made to other processes, objects or components, the replicas generate the same result, message or request.

Many application programs written in modern programming languages (such as C++, Java, etc.) involve multi-threading, which is a source of non-determinism. Unless it is properly handled, non-determinism can lead to inconsistency in the states of the replicas. To maintain strong replica consistency, it is necessary to sanitize or mask such sources of non-determinism, i.e., to render a replicated application program virtually deterministic. A virtually deterministic replicated application program is an application program that exists as two or more replicas and that may involve non-deterministic decisions; however, for those non-deterministic decisions that affect the states of the replicas, the replicas must make the same non-deterministic decisions.

U.S. Pat. Nos. 5,577,261 and 5,794,034 which are incorporated herein by reference describe the implementation of "process management" functions, such as the claim( ), release( ), suspend( ) and signal( ) functions, which are also used by the current invention. Operations involving those methods are rendered consistent by having each processor claim a global mutex (called GLUPP) before performing any "process management" operation. Once it has acquired the global mutex, the process performs the operation and then distributes the results to the other processors before relinquishing the global mutex.

U.S. Pat. No. 4,718,002 which is incorporated herein by reference describes how a mutex can be granted to processors, processes, replicas or threads in a distributed system. Each grant of a mutex requires three messages, two messages to claim and grant the mutex and one message to release the mutex. It should be appreciated that this approach requires the communication of multiple additional messages for claiming, granting and releasing a mutex.

U.S. Pat. No. 5,621,885 which is incorporated herein by reference describes a strategy based on Primary/Backup replication, in which the Primary replica executes the required operations. When the Primary replica performs an I/O operation, the results of the I/O operation are communicated to the Backup replica, so that the Backup replica performs the same operation as the Primary replica. This strategy is directed at maintaining consistency between Primary and Backup replicas only for I/O operations and does not address inconsistency that arises from multithreading.

U.S. Pat. Nos. 5,802,265 and 5,968,185 which are incorporated herein by reference are related to the TFT system described below and describe a strategy based on the Primary/Backup approach, in which the Primary replica executes the required operations. When the Primary replica performs an asynchronous or non-deterministic operation, it communicates the results of that operation to the Backup replica, so that the Backup performs the same operation as the Primary. The teachings of these patents disclose no mechanism for guaranteeing that a Backup receives such communication before or concurrently with the communication of results by the Primary to an entity external to the system. As a result, the design is exposed to the risk that the Primary might perform actions and communicate results of those actions to clients, and subsequently fail without ensuring that the Backups have received the communication from the Primary about the operating system interactions. It should be appreciated that such a fault can leave a Backup with the obligation of reproducing those actions; however, the Backup replica might lack the necessary information to do so.

The TARGON/32 system (A. Borg, W. Blau, W. Graetsch, F. Herrmann and W. And, Fault tolerance under Unix, ACM Transactions on Computer Systems, vol. 7, no. 1, 1989, pp. 1-24, incorporated herein by reference) provides mechanisms for the Unix operating system that ensure consistent processing by multiple replicas of asynchronous operations and signals, such as the claim( ) and release( ) functions. A designated control processor (the Primary) records a checkpoint immediately before it processes an asynchronous operation. If the control processor fails, a Backup processor restarts from the checkpoint and then processes the asynchronous operation immediately thereafter, ensuring that the Backup processes the operation starting from the same state as the control processor.

The Delta-4 system (D. Powell (ed.), Delta-4: A Generic Architecture for Dependable Distributed Computing, Springer-Verlag, 1991, incorporated herein by reference) provides support for non-deterministic application programs that employ semi-active or passive replication. To provide such support, Delta-4 queues interrupts until the application program executes a polling routine in which the replicas synchronize and agree on the interrupts received and the order in which to process them.

The Hypervisor system (T. C. Bressoud and F. B. Schneider, Hypervisor-based fault tolerance, ACM Transactions on Computer Systems, vol. 14, no. 1, 1996, pp. 80-107, incorporated herein by reference) and the Transparent Fault Tolerance (TFT) system (T. C. Bressoud, TFT: A software system for application-transparent fault tolerance, Proceedings of the IEEE 28th Fault-Tolerant Computing Symposium, Munich, Germany, June 1998, pp. 128-137, incorporated herein by reference) uses a Primary/Backup approach and aims for transparency to the application and the operating system by utilizing hardware instruction counters to count the instructions executed between two hardware interrupts. The TFT system utilizes object code editing to modify the program code to provide fault tolerance.

Other researchers (J. H. Sly and E. N. Elnozahy, Supporting non-deterministic execution in fault-tolerant systems, Proceedings of the IEEE 26th Fault Tolerant Computing Symposium, Sendai, Japan, June 1996, pp. 250-259, incorporated herein by reference) have introduced a software instruction counter approach, analogous to the hardware instruction counter approach of the Hypervisor system, to count the number of instructions between non-deterministic events in log-based rollback-recovery systems. If a fault occurs, the instruction counts are used to replay the instructions and the non-deterministic events at the same execution points.

Non-preemptive deterministic scheduler strategies also exist that impose a single logical thread of control on the replicas to maintain strong replica consistency (P. Narasimhan, L. E. Moser and P. M. Melliar-Smith, Enforcing determinism for the consistent replication of multithreaded CORBA applications, Proceedings of the IEEE 18th Symposium on Reliable Distributed Systems, Lausanne, Switzerland, October 1999, pp. 263-273, incorporated herein by reference). The effect of this strategy is to undo the multithreading that was programmed into the application program.

Transactional Drago (S. Arevalo, R. Jimenez-Peris and M. Patino-Martinez, Deterministic scheduling for transactional multithreaded replicas, Proceedings of the IEEE 19th Symposium on Reliable Distributed Systems, Nurnberg, Germany, October 2000, pp. 164-173, incorporated herein by reference) also uses a non-preemptive deterministic scheduler but is configured for use in transaction processing systems.

Therefore, a need exists for systems, software mechanisms, methods, improvements and apparatus for providing strong replica consistency for multithreaded application programs based on semi-active and passive replication that maintain application transparency. The systems, software mechanisms, methods, improvements and apparatus in accordance with the present invention satisfy that need, as well as others, and overcome deficiencies in previously known techniques.

BRIEF SUMMARY OF THE INVENTION

The present invention can be described as a system, software mechanisms, methods, improvements and apparatus that aim at achieving strong replica consistency of multithreaded application programs that are replicated using the leader-follower (primary-backup) semi-active or passive replication strategy. This invention is applicable to distributed systems in which the several computers within the distributed system share no memory and communicate with each other by messages.

Unlike U.S. Pat. Nos. 5,802,265 and 5,968,185, described above, the present invention ensures that the Backup replicas receive the necessary access ordering information before or concurrently with the communication of results by the Primary replica to an entity external to the system. Unlike the Hypervisor system, previously described, the current invention does not attempt to maintain transparent fault tolerance by counting instructions executed between hardware interrupts. Moreover, unlike U.S. Pat. No. 4,718,002, described above, the present invention does not require the communication of additional separate messages for claiming, granting and releasing a mutex over and above the regular messages that are transmitted during normal operation. Unlike the non-preemptive scheduler strategies, previously described, the current invention allows for the maximum degree of concurrency of threads while maintaining strong replica consistency.

An aspect of this invention is to provide mechanisms for fault-tolerant systems based on replication, in which an application process, object or component is replicated, and the replicas of the application process, object or component are typically located on different computers within a distributed system. In the event that one of the replicas is disabled by a fault, another replica can continue to provide service.

Another aspect of this invention is to employ semi-active or passive replication, in which there are two or more replicas of an application process, object or component, one of which is distinguished as the Primary replica and the others of which are called the Backup replicas. If the Primary replica is disabled by a fault, one of the Backup replicas takes over as the Primary replica and continues to provide the service.

There are many sources of nondeterminism in application programs. The mechanisms of this invention address nondeterminism caused by multithreading in replicated application programs that use the semi-active or passive replication strategy. They assume that the application program has been correctly coded so that each resource that is shared by two or more threads in a process, object or component is protected by a shared resource control construct, such as a mutex, that allows only of those threads to access the shared resource at a time. They assume further that each thread has a unique thread identifier and that each mutual exclusion construct (mutex) has a unique mutex identifier.

To maintain strong replica consistency for replicated multithreaded application programs, it is necessary to sanitize or mask sources of non-determinism. The mechanisms of the present invention sanitize multithreaded application programs based on semi-active or passive replication strategies. They mask multithreading as a source of non-determinism in the replicas, so that strong replica consistency is maintained.

The present invention exploits a reliable source-ordered multicast protocol to maintain strong replica consistency. Reliable means that the replicas of a process, object or component receive the messages that are multicast to it. Source ordered means that the replicas of a process, object or component receive the messages from a given source in the same order.

For unithreaded application programs based on semi-active or passive replication, a multicast protocol that delivers request and reply messages reliably and in the same order to the replicas can be used to maintain strong replica consistency. For multithreaded application programs, the problem of maintaining strong replica consistency is more difficult because two threads in a replica can access shared resources, such as shared data, in an order that is different from the order in which the corresponding threads in another replica access the shared data; consequently, the states of the replicas can become inconsistent.

For multithreaded application programs, if two threads access data that are shared between them, then only one of those threads can access that shared data at a time. Therefore, to maintain strong replica consistency, the shared data must be protected, preferably with a mutex, wherein a thread must claim the mutex and enter a critical section of code, preferably protected with a mutex, before accessing the shared data. In the presence of replication, the threads in the replicas must claim the mutexes, enter the critical sections and access the shared data in an identical order.

The mechanisms of this invention ensure that, for replicated multithreaded application programs based on the leader-follower (passive-backup) strategy of semi-active or passive replication, the threads in the replicas are granted their claims to mutexes, semaphores and so forth in the same order, even though the threads in the replicas might claim the mutexes, semaphores and so forth in different orders. As a result, the mechanisms of this invention eliminate multithreading as a source of nondeterminism in replicated multithreaded application programs. In other words, they sanitize such programs by rendering those programs virtually deterministic.

The mechanisms of this invention depend on the existence of a Primary replica that dictates the order in which the threads in the Backup replicas claim, and are granted, accesses to shared resources (i.e., mutexes). The Primary replica piggybacks this resource access ordering and granting information (i.e., mutex ordering information) on the messages that it multicasts.

In the Primary replica, the mechanisms of the present invention piggyback access ordering information, such as mutex ordering information, onto the regular messages that they multicast. The access ordering information conveys the order in which the threads in the Primary replica have been granted their claims to access shared resources. In the Backup replicas, the mechanisms of the present invention ensure that the corresponding threads are granted corresponding claims to access the shared resources, in the same order as the threads in the Primary replicas, as dictated by the access ordering information received from the Primary replica.

Embodiments of the present invention are exemplified with threads of replicas claiming and releasing mutexes, semaphores and so forth, associated with shared resources, preferably shared data and code that manipulates such shared data. In a Backup replica, the granting of a given resource, to a given thread, for a given claim number, is constrained until the Primary has been granted the corresponding access, and other accesses corresponding to previous accesses have been completed by the Backup replica, and has communicated those accesses to the Backup replica. In this way, threads in Backup replicas are constrained to follow the order and granting of shared resource accesses by threads in the Primary replica, as communicated by the Primary replica to the Backup replicas. As a result, the system, methods, software mechanisms, improvements and apparatus of the present invention sanitize replicated multithreaded application programs, by masking multithreading as a source of non-determinism and, thus, render such programs virtually deterministic, thereby maintaining strong replica consistency.

To maintain application transparency for replicated multithreaded application programs based on the leader-follower strategy of semi-active or passive replication, while maintaining strong replica consistency, the invention is preferably implemented using the technique of library interpositioning to intercept the calls to functions in the operating system's thread library and to divert them to another library. An example of this other library is herein referred to as the Consistent Multithreading (CMT) library, which is the preferred embodiment of this invention and is so-named because it eliminates multithreading as a source of non-determinism in replicated multithreaded application programs and maintains strong replica consistency.

The Consistent Multithreading (CMT) library is interposed ahead of the operating system's thread library, such as the standard POSIX thread (PTHREAD) library. The CMT library contains control program code comprising wrapper functions for the functions of the operating system's thread library that claim and release mutexes, semaphores, condition variables, and so forth. The application program invokes the wrapper functions of the CMT library, instead of the corresponding functions of the operating system's thread library. The wrapper functions of the CMT library subsequently invoke the corresponding functions of the operating system's thread library. This allows the CMT library to modify the behavior of the replicated multithreaded application program, without modifying either the application program or the functions of the operating system's thread library.

When a thread in the Primary replica invokes a function to claim a mutex, the CMT claim( ) function is invoked. The CMT claim( ) function in turn invokes the claim( ) function of the operating system's thread library and subsequently piggybacks ordering and granting information onto the next message that it multicasts. The ordering and granting information specifies which thread in the Primary replica has been granted access to a shared resource (mutex) for a particular access request. The multicast protocol delivers messages reliably and in the same source order to the Backup replicas. In the Backup replicas, the threads are granted accesses to shared resources (mutexes) in the same order as the corresponding accesses were granted to the corresponding threads in the Primary replica, based on the ordering and granting information that Primary replica multicasts to the Backup replicas.

The multicast protocol might communicate a message containing the ordering and granting information directly to the Backup replicas. Alternatively, and preferably, the ordering and granting information is piggybacked on the regular messages. If a regular message, such as a reply message sent by a Primary server replica to a client in response to a request message from that client, can be multicast to both the client and the Backup server replicas, then the regular message communicates the ordering and granting information to the Backup server replicas. If, however, the multicast protocol is such that the regular message from the Primary server replica cannot be multicast to both the client and the Backup server replicas, then the ordering and granting information is piggybacked on the next regular message that the Primary server sends to the client, and the client also piggybacks that same ordering and granting information on the next message it multicasts, either its next request message or an acknowledgment message for the reply message, to the Primary and Backup server replicas.

The mechanisms of this invention sanitize the non-deterministic behavior of the threads in the different replicas in claiming mutexes, in a manner that is transparent to the application program, and similarly for the release( ) function and for semaphores, control variables, and other similar structures.

For application programs that run on an operating system that provides Dynamically Linked Libraries (DLL) (e.g., Solaris, Linux, Windows), a command is issued to the DLL mechanisms that causes the DLL mechanisms to interpose the Consistent Multithreading (CMT) library, containing the wrapper functions, ahead of the operating system's thread library. This interpositioning causes the application program to invoke the functions of the CMT library, rather than the corresponding functions of the operating system's thread library directly. Thus, the mechanisms involve no modification or recompilation of the application program and, thus, are transparent to the application program.

If, on the other hand, the operating system does not provide Dynamically Linked Libraries (e.g., VxWorks), it is necessary to insert a statement into the makefile for the application program that directs the linker to include the CMT library ahead of the operating system's thread library. In this case, the application program is not modified but the makefile is modified.

The mechanisms of this invention allow concurrency of threads that do not simultaneously claim the same mutex, or that claim different mutexes, while maintaining strong replica consistency. As a result, the mechanisms of the invention provide the maximum degree of concurrency while maintaining strong replica consistency.

The mechanisms of this invention sanitize multithreaded application programs in that they mask multithreading as a source of non-determinism so that strong replica consistency is maintained.

Thus, the present invention provides an extension to existing systems, in particular that have an operating system thread library that grants access to shared resources without regard to consistent granting of those accesses across multiple replicas, to provide fault tolerance and consistent replication based on the semi-active or passive replication strategies. It should be appreciated that, in the current invention, the Primary replica dictates the order in which threads in a Backup replica are granted accesses to shared resources, which order is the same as the order in which the corresponding threads in the Primary replica are granted corresponding accesses to corresponding shared resources. Further aspects of the invention include: (1) at the Primary replica, piggybacking access ordering information onto regular multicast messages that specifies the order in which threads in the Primary replica have been granted accesses to shared resources, and (2) at a Backup replica, receiving multicast messages from the Primary replica that contain the access ordering information, which determines the order in which corresponding threads in the Backup replica are granted corresponding accesses to corresponding shared resources.

The source-ordered multicast protocol preferably piggybacks the ordering information on regular messages being multicast, therein minimizing communication overhead. The invention ensures that the Backup replicas have the access ordering information that they need, in the event that the Primary replica fails, to order to maintain strong replica consistency.

Further aspects of the invention will be brought out in the following portions of this document, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
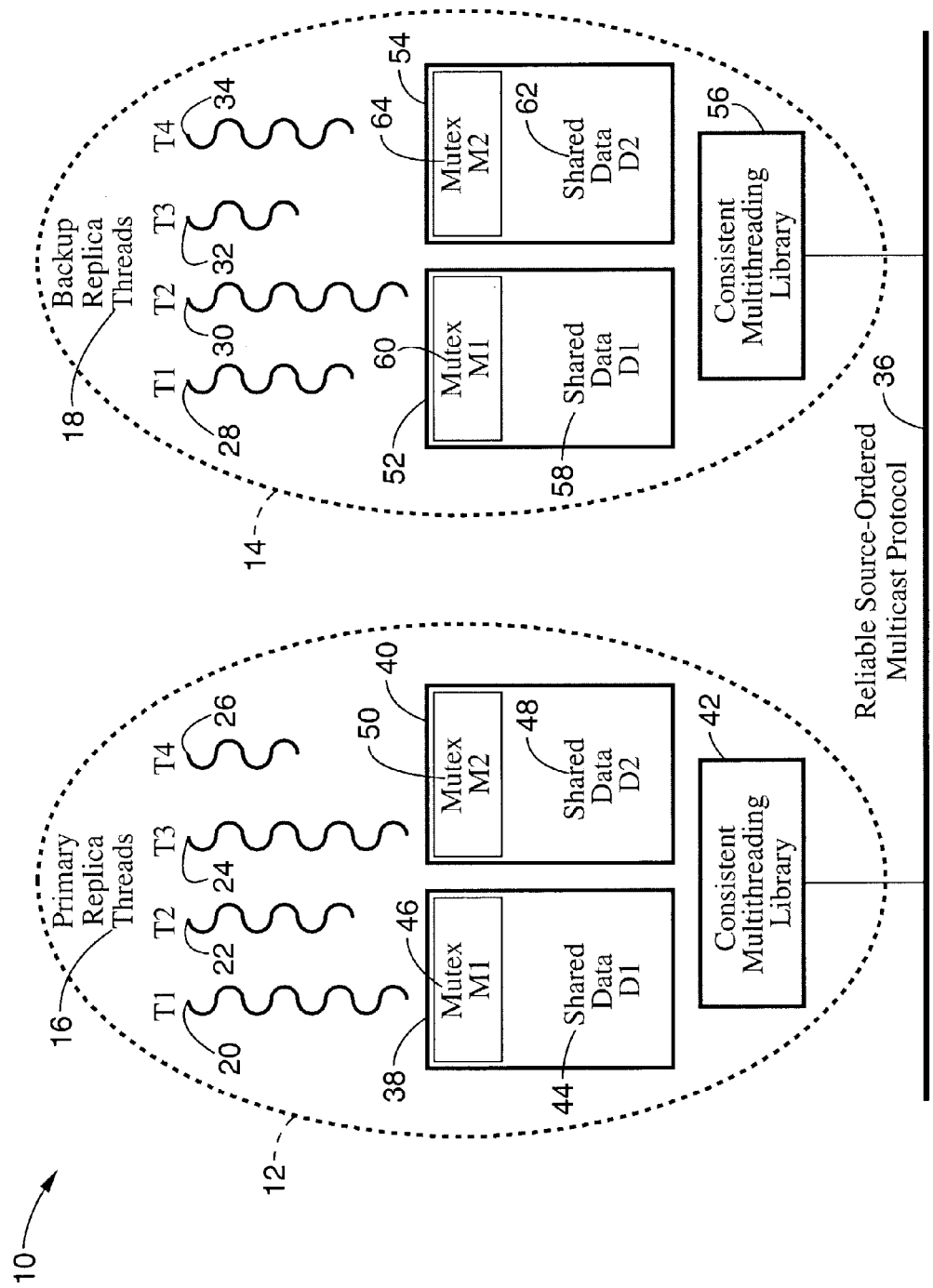
FIG. 1 is a diagram of two replicas, the Primary replica and a Backup replica, each executing multiple threads that share data, which are protected by mutexes. In accordance with the preferred embodiment of the invention, the diagram shows the Consistent Multithreading (CMT) library and a reliable source-ordered multicast protocol.

Referring more specifically to the drawings, for illustrative purposes the present invention is embodied in the apparatus generally shown in FIG. 1 through FIG. 10. It will be appreciated that the apparatus may vary as to configuration and as to details of the parts, and that the method may vary as to the specific steps and sequence, without departing from the basic concepts as disclosed herein. The example diagrams and flow charts herein may be implemented in a number of different ways to achieve the same or similar results without departing from the present invention.

It should be noted that the mechanisms of the invention pertain to the semi-active and passive replication strategy. The algorithms, diagrams and descriptions below generally refer to semi-active replication, but the mechanisms apply equally to passive replication. Only one Backup replica is shown in the diagrams, but the mechanisms of the invention apply equally if multiple Backup replicas are used.

In the algorithms, diagrams and descriptions below, the term mutex refers to a mutual exclusion construct, in particular a binary semaphore, which respects the priority transfer mechanisms of the scheduler for an operating system. However, the mechanisms of the invention apply equally well to counting semaphores, condition variables, and other similar mechanisms for controlling access to a shared resource.

The mechanisms of this invention employ the technique of library interpositioning to intercept the calls to functions in the operating system's thread library. For example, for the standard POSIX Thread (PTHREAD) library, the mechanisms intercept the calls to the functions in the PTHREAD library. The Consistent Multithreading (CMT) library that is the preferred embodiment of this invention contains wrappers for the functions in the operating system's thread library, such as the pthread_mutex_lock( ) and pthread_mutex_unlock( ) functions in the PTHREAD library. In view of the applicability of these mechanisms to thread libraries, other than the PTHREAD library, these functions and the corresponding wrapper functions are referred to more generally as claim( ) and release( ), respectively.

When a thread of the Primary replica invokes a function to claim a mutex, the claim( ) wrapper function of the CMT library is invoked, instead of the corresponding claim( ) function in the operating system's thread library. The CMT claim( ) function takes appropriate steps, shown in FIG. 5 and FIG. 7, to ensure that the threads in the Backup replicas are granted their claims to the mutexes in the same order as the corresponding threads in the Primary replica were granted their claim to the mutexes.

For each mutex M, or other form of shared resource control, the consistent multithreading mechanisms maintain a boolean variable, such as M.available, which indicates whether or not mutex M is available. For each thread T, the consistent multithreading mechanisms maintain a boolean variable, such as T.suspended, which indicates whether or not thread T is suspended.

In the Primary replica, when thread T claims a mutex M as its Nth claim to any mutex, and that mutex is already being held by another thread, the consistent multithreading mechanisms set T.suspended to true and suspend thread T using the standard mutex scheduling mechanisms of the operating system, which subsequently resume thread T, using priority transfer, as appropriate.

In the Primary replica, the consistent multithreading mechanisms maintain a queue, the ordered claims queue of triples (T, M, N), where thread T has claimed, and has been granted, mutex M and this is the Nth claim for any mutex that thread T has made. The ordered claims queue spans different threads, different mutexes and different claims by the threads. It should be appreciated that the Nth claim numbering can be based on the numbering of claims to any mutex, numbered claims for mutexes from a given thread, numbered claims for claims to a given mutex from a given thread, or otherwise identified according to other alternative means for identifying claims.

In the Primary replica, as the mutexes are granted to the threads, the consistent multithreading mechanisms append a triple (T, M, N) to the ordered claims queue, where N is the Nth claim of any mutex by thread T. The consistent multithreading mechanisms remove one or more such triples from the ordered claims queue, and piggyback those triples (the mutex ordering information) onto the next message that they send, as shown at 100 and 114 in FIG. 2. If the Primary replica does not have a regular data message to multicast in a timely manner, such as subject to a preconfigured timeout, it multicasts a control (acknowledgment) message containing the mutex ordering information.

In a Backup replica, thread T is not allowed to claim mutex M as its Nth claim to any mutex, until the message from the Primary replica that contains the ordering information (T, M, N) is ordered and delivered to the Backup replica. The underlying reliable source-ordered multicast protocol guarantees that the Backup replicas receive the messages from the Primary replica and that they receive those messages in the same order.

In a Backup replica, for each mutex M, the consistent multithreading mechanisms maintain an M.orderedClaims queue of (T, N) pairs, in the order in which the Backup replicas receive those claims from the Primary replica. The consistent multithreading mechanisms at a Backup replica append a (T, N) pair to the M.orderedClaims queue, as the Backup replica receives messages containing the (T, M, N) triples from the Primary replica.

In a Backup replica, when thread T claims a mutex M as its Nth claim to any mutex, if the entry (T, N) is not the first entry in the M.orderedClaims queue, the consistent multithreading mechanisms set T.suspended to true. The consistent multithreading mechanisms resume a thread T that was suspended in the order in which the pairs (T, N) occur in the M.orderedClaims queue, rather than in the order in which they were suspended or an order determined by the operating system scheduler.

Two Multithreaded Replicas with the Interposed CMT Library

By way of example, FIG. 1 depicts two replicas 10, the Primary replica 12 and a Backup replica 14, each executing in its own process. A reliable source-ordered multicast protocol 36 conveys the messages to the Primary replica and the Backup replica, and delivers the messages reliably and in the same order (linear sequence) to both of the replicas.

In the Primary replica 12 there are four threads 16, comprising threads T1-T4 20-26. Thread T1 20 and thread T2 22 access the shared resource 38 comprising the shared data D1 44 using mutex M1 46, which protects that shared data. Thread T3 24 and thread T4 26 access the shared resource 40 comprising the shared data D2 48 using mutex M2 50, which protects that shared data. The CMT library 42 is interposed between the Primary replica 16 and the operating system's thread library and is dynamically linked into the Primary replica.

Similarly, in the Backup replica 14 there are four corresponding threads 18, comprising threads T1-T4 28-34. Thread T1 28 and thread T2 30 access the shared resource 52 comprising the shared data D1 58 using mutex M1 60, which protects that shared data. Thread T3 32 and thread T4 34 access the shared resource 54 comprising the shared data D2 62 using mutex M2 64, which protects that shared data. The CMT library 56 is interposed between the Backup replica 18 and the operating system's thread library and is dynamically linked into the Backup replica.

In the Primary replica 12, because thread T1 20 and thread T2 22 can each read and write the shared data D1 44, access to which is protected by mutex M1 46, and, similarly, for thread T3 24 and thread T4 26 and the shared data D2 48. However, thread T1 20 and thread T2 22 share no data with thread T3 24 and thread T4 26; as a result thread T1 20 and thread T2 22 can execute concurrently with thread T3 26 and thread T4 28 without the need for a mutex. The same is true for the corresponding threads in the Backup replica.

Scenario That Illustrates the CMT Mechanisms

Figure 2:
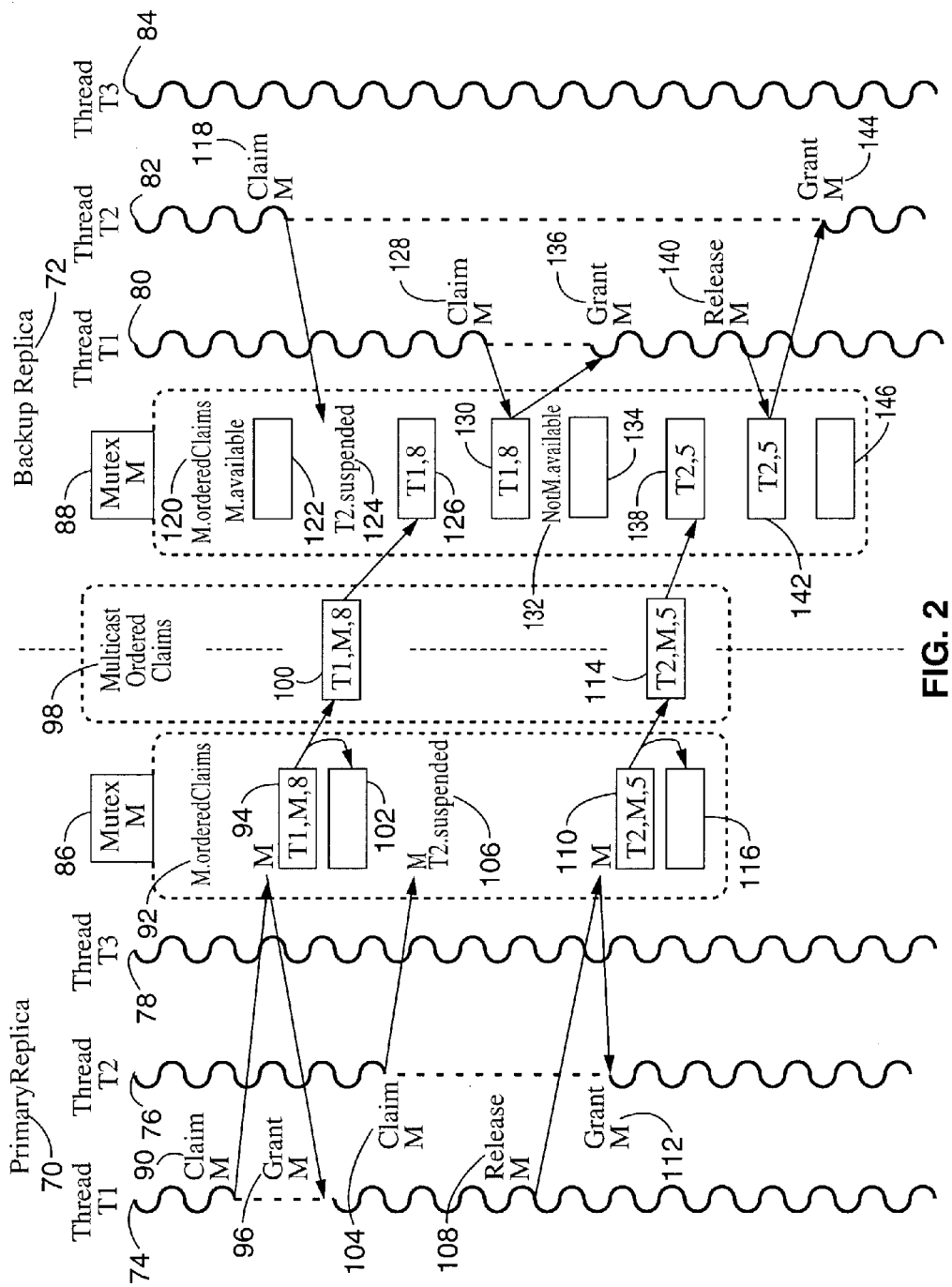
FIG. 2 is a process flow diagram of two replicas, the Primary replica and a Backup replica, each executing multiple threads, with a history of the order in which mutexes are claimed, granted and released, and in which ordered claims are piggybacked and multicast.

FIG. 2 shows an example execution of the CMT library mechanisms with the Primary replica and a single Backup replica. It is evident to those skilled in the art that while the figure depicts only a single Backup replica, the mechanisms are equally applicable to multiple Backup replicas. In the figure, the Primary replica 70 executes threads T1 74, T2 76 and T3 78. Thread T1 74 and thread T2 76 access shared data, protected by mutex M 86. Thread T3 78 does not share data with T1 74 and T2 76 and, thus, executes concurrently with them without the need for a mutex.

Similarly, a Backup replica 72 executes threads T1 80, T2 82 and T3 84. Thread T1 80 and thread T2 82 access shared data, protected by mutex M 88. Thread T3 84 does not share data with thread T1 80 and thread T2 82 and, thus, executes concurrently with them without the need for a mutex.

In the Primary replica 70, when thread T1 74 invokes the CMT claim( ) function to claim mutex M, the CMT claim( ) function invokes the claim( ) function of the operating system's thread library to claim mutex M 86. If mutex M 86 is unavailable, the operating system suspends thread T1 74. The operating system may use thread priority to determine the thread to which it grants the mutex next, and may use priority inheritance to expedite the granting of mutexes to high priority threads. Referring to the figure, because mutex M 86 is available and thread T1 74 is the highest priority thread waiting for mutex M, the operating system grants mutex M 86 to thread T1 74. The CMT claim( ) function then appends the claim (T1, M, 8) 94 to the M.orderedClaims queue 92, and returns to the application program, granting mutex M 86 to thread T1 74 and allowing it to proceed. Subsequently, the consistent multithreading mechanisms extract the claim (T1, M, 8) from the M.orderedClaims queue, which then becomes empty 102, and multicast a message containing the claim (T1, M, 8) piggybacked onto the message 100.

Similarly, when thread T2 76 in the Primary replica 70 invokes 104 the claim( ) function of the CMT library to claim mutex M 86, the CMT claim( ) function invokes the claim( ) function of the operating system's thread library to claim mutex M 86. Because mutex M 86 is unavailable, having been granted to thread T1 74, the operating system suspends 106 thread T2 76.

When thread T1 74 invokes 108 the release( ) function of the CMT library to release mutex M 86, the CMT release( ) function invokes the release( ) function of the operating system's thread library to release mutex M 86, and then returns, allowing thread T1 74 to proceed. The operating system grants 112 mutex M 86 to thread T2 76 and awakens that thread, which was previously suspended 106 by the CMT claim( ) function, as described above. It resumes the processing of that function, which then appends the claim (T2, M, 5) to the M.orderedClaims queue 110, and returns to the application program, granting 112 mutex M 86 to thread T2 76, and allowing it to proceed. Subsequently, the consistent multithreading mechanisms extract the claim (T2, M, 5) from the M.orderedClaims queue, which then becomes empty 116, and multicasts a message containing that claim piggybacked onto the message 114.

In the Backup replica 72, when thread T2 82 invokes 118 the claim( ) function to claim mutex M 88, the CMT claim( ) function checks whether the claim is the first entry in the M.orderedClaims queue 120. Because that queue is empty 122, the CMT claim( ) function sets T2.suspended 124 to true and then invokes the suspend( ) function of the operating system's thread library to suspend thread T2 82.

Figure 9:
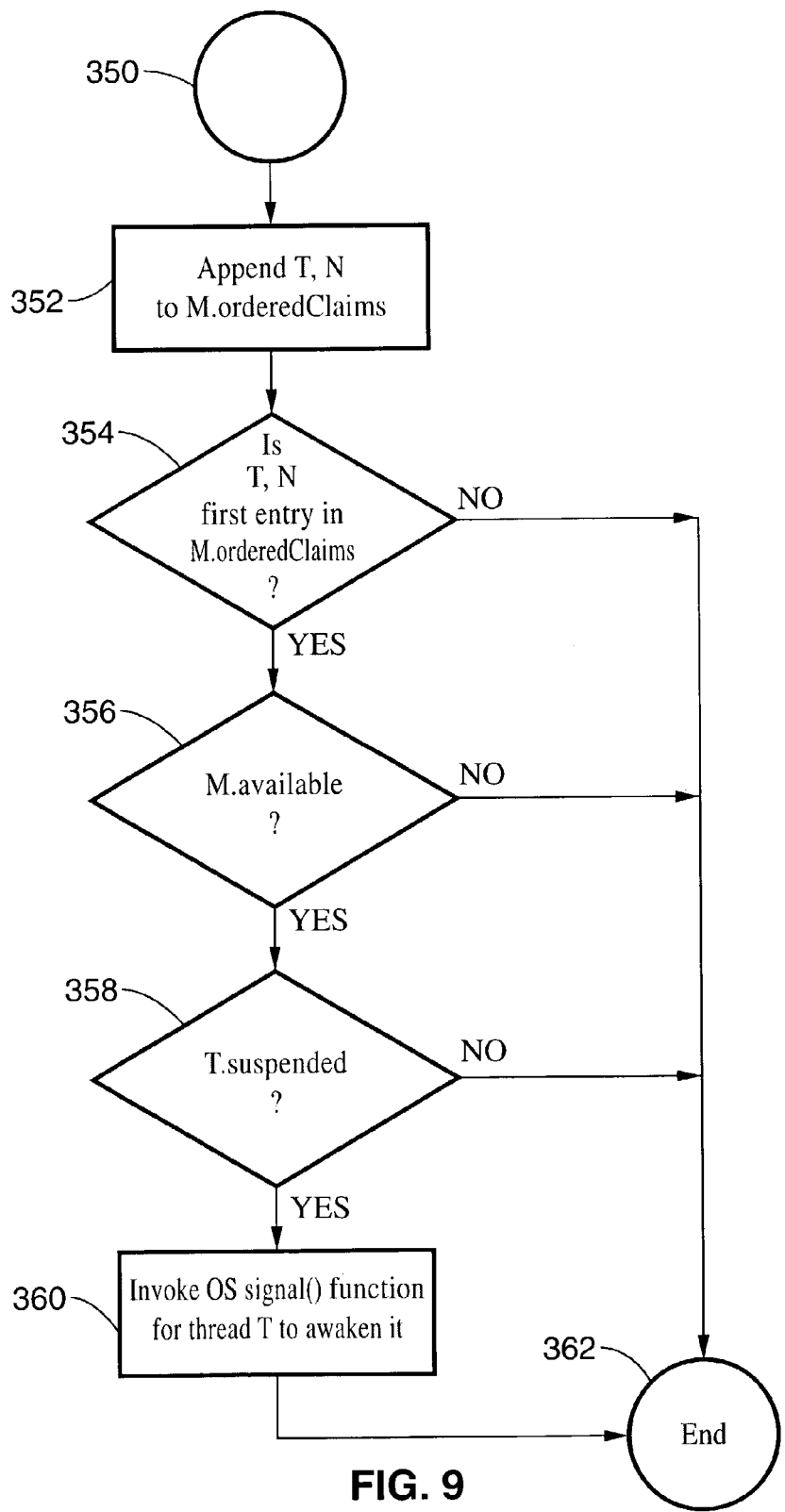
FIG. 9 is a flow chart that shows a Backup replica receiving a message with piggybacked ordered claims and the steps taken by the CMT message handler when it receives that message.

When the Backup replica 72 receives the claim (T1, M, 8) that the Primary replica 70 multicast 100, and that the multicast protocol delivered to the Backup replica 72, the consistent multithreading mechanisms in the Backup replica 72 appends (T1, 8) to the M.orderedClaims queue 126. Even though (T1, 8) is the first entry in the M.orderedClaims queue, because T1.suspended 358 in FIG. 9 is false, the consistent multithreading mechanisms do not invoke the signal( ) function of the operating system's thread library to awaken thread T1.

When thread T1 80 in the Backup replica 72, subsequently invokes 128 the claim( ) function to claim mutex M 88, the CMT claim( ) function checks whether the claim (T1, 8) is the first entry in the M.orderedClaims queue and whether mutex M 88 is available. Because claim (T1, 8) is the first entry in that queue 130 and mutex M 88 is available, the CMT claim( ) function sets M.available to false 132 and then invokes the claim( ) function of the operating system's thread library to claim mutex M 88 for thread T1 80. The CMT claim( ) function then removes (T1, 8) from the M.orderedClaims queue, which then becomes empty 134, and returns, granting 136 mutex M 88 to thread T1 80.

The Backup replica 72 receives the claim (T2, M, 5) 138 that the Primary replica 70 multicast 114 and the multicast protocol delivered. The CMT message handler appends (T2, 5) to the M.orderedClaims queue 138. Even though (T2, 5) is the first entry in the M.orderedClaims queue, because M.available 356 in FIG. 9 is false, the consistent multithreading message handler does not invoke the signal( ) function of the operating system's thread library to awaken thread T2 82.

When thread T1 80 in the Backup replica 72 has finished accessing the shared resource, it invokes 140 the release( ) function to release mutex M 88. The CMT release( ) function invokes the release( ) function of the operating system's thread library to release mutex M 88, sets M.available to true, and checks the M.orderedClaims queue. Because (T2, 5) is the first entry 142 in the M.orderedClaims queue (which indicates that thread T2 82 is waiting for mutex M 88), and because thread T2.suspended is true, the CMT release( ) function invokes the signal( ) function of the operating system's thread library to awaken thread T2 82. The release( ) function then returns, allowing T1 80 to proceed.

Meanwhile, thread T2 82 in the Backup replica 72, which was suspended by the CMT claim( ) function, awakens and resumes processing. The CMT claim( ) function checks M.available and also the M.orderedClaims queue. As (T2, 5) is the first entry in the M.orderedClaims queue, the CMT claim( ) function sets T2.suspended to false and sets M.available to false. The CMT claim( ) function then invokes the claim( ) function of the operating system's thread library to claim mutex M 88 for thread T2 82, and the operating system grants 144 mutex M 88 to thread T2 82. The CMT claim( ) function removes (T2, 5) from the M.orderedClaims queue, which then becomes empty 146. The CMT claim( ) function then returns, allowing thread T2 82 to proceed.

Mutex Ordering Requirements for Strong Replica Consistency

One might conclude that, for semi-active and passive replication, if the Primary server replica fails and will never subsequently generate a reply, then a Backup server replica can simply start processing the request that the Primary replica failed to complete, and now only the Backup replica matters. That conclusion is false. During its operation, before it failed, the Primary replica might have invoked methods of other servers. If a Backup replica processes a method invocation that the failed Primary replica did not complete, but the Backup replica invokes the methods of the other servers in a different order than the Primary replica invoked the methods before it failed, then inconsistencies in the states of the replicas can arise. Consequently, the Primary replica must communicate ordering information to the Backup replicas so that, in the event that the Primary replica fails, the threads of the Backup replicas can process the same requests in the same order, and can be granted the same mutexes in the same order, so that the processing by the Backup replica exactly duplicates the processing that the Primary replica performed before it failed, insofar as that processing is visible to other objects.

Figure 3:
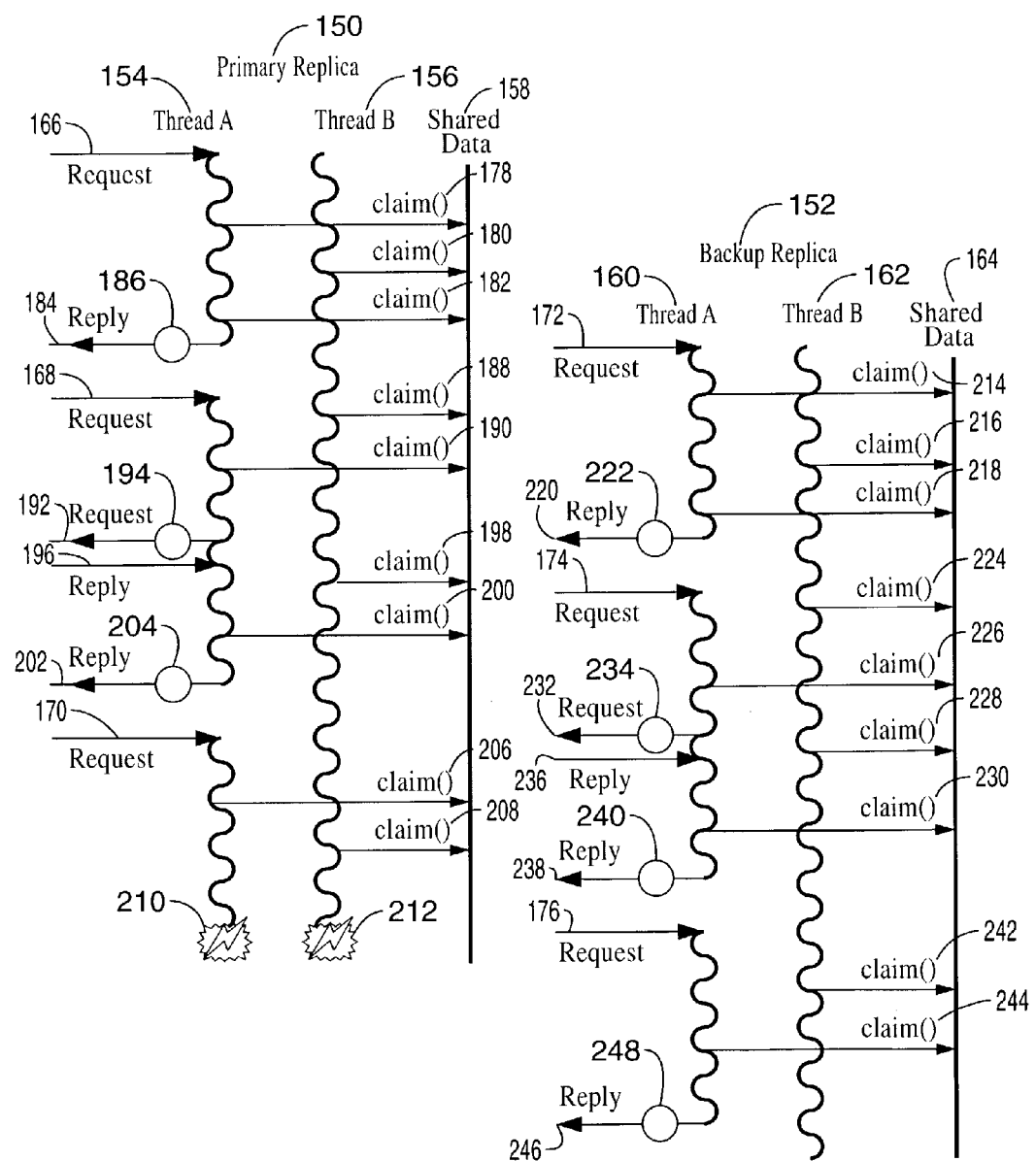
FIG. 3 is a process flow diagram of two replicas, the Primary replica and a Backup replica, each with two threads that share resources, such as data, that illustrates the mutex ordering requirements for strong replica consistency.

FIG. 3 shows a replicated server with a Primary replica 150 and a Backup replica 152. In the Primary replica 150 there are depicted two threads, thread A 154 and thread B 156, together with data 158 that are shared by the two threads, where thread B 156 processes continuously and thread A 154 processes requests from clients, 166, 168 and 170. When the threads access the shared data 158, they claim mutexes and are granted those mutexes in a specific order. During the processing of the first request by thread A 154, the claims for the mutex are granted in the order: thread A 178, thread B 180 and thread A 182. As long as the processing is concealed inside Primary replica 150, there is no need to communicate that ordering information to the Backup replica 152. When thread A 154 generates its reply to the client 184, the mutex ordering information is communicated to the Backup replica 152. The mutex ordering information is piggybacked 186 on the reply message 184.

In the figure it can be seen that thread A processes a second request 168. Again, mutexes are granted in the order, thread B 188 followed by thread A 190. Thread A 154 then invokes a method of another server and generates a request 192. To maintain the consistency of the Backup replica 152, so that it can make that same request if the Primary replica 150 fails, the Backup replica 152 is provided the mutex ordering information prior to that request, and that information is preferably piggybacked 194 on the request message 192. After thread A 154 has received the reply 196 to its request 194, the mutex is granted first to thread B 198 and then to thread A 200 before thread A 154 generates its reply 202. It should be appreciated that mutex ordering information is piggybacked 204 on the reply message 202.

Thread A then starts to process another request 170. The mutex is granted to thread A 206 and then to thread B 208. Before thread A can complete its processing of this request, the Primary replica 150 fails 210 and 212. It did not communicate the mutex ordering information to the Backup replica; however, it also did not communicate any results of that processing to any other object. Thus, the order in which the mutex was granted is not significant.

The right side of FIG. 3 shows the Backup replica 152, again with thread A 160, thread B 162 and shared data 164. The operations of the Backup replica 152 are slightly delayed relative to the Primary replica because the Backup replica must wait until it has received the mutex ordering information. Thread A 160 starts to process the request 172 when it receives the mutex ordering information from the Primary replica 186. That mutex ordering information directs the Backup replica 152 to grant the mutex in the order thread A 214, thread B 216 and thread A 218. Note that the processing and the granting of mutexes does not occur at the same time as in the Primary replica, or even at the same relative time, but the order in which the mutexes are granted is the same as in the Primary replica 150. Consequently, thread A 160 in the Backup replica 152 performs the same processing as thread A 154 in the Primary replica 150, and thread A 160 in the Backup replica 152 generates a reply message 220, with the same mutex ordering information 222 piggybacked on the message.

Similarly, in the Backup replica 152, during the processing of the next request 174, leading to the generation of a request 232, a reply 236 to that request and the reply to the client 238, the mutex is granted in exactly the same order 224, 226, 228, and 230 as that mutex was granted in the Primary replica 150. However, when thread A 160 processes the next request 176, no mutex ordering information is available. Consequently, in the Backup replica the mutex is granted to the threads in whatever order the operating system deems appropriate. That order 242, 244 differs from the order in which the mutex was granted to the threads in the Primary replica, and the reply generated by the Backup replica 246 might be different from the reply that the Primary replica would have generated had it not failed but, because the Primary replica became faulty and did not generate that reply, any such difference is of no significance.

Mechanisms That Communicate Mutex Ordering Information

Figure 4A:
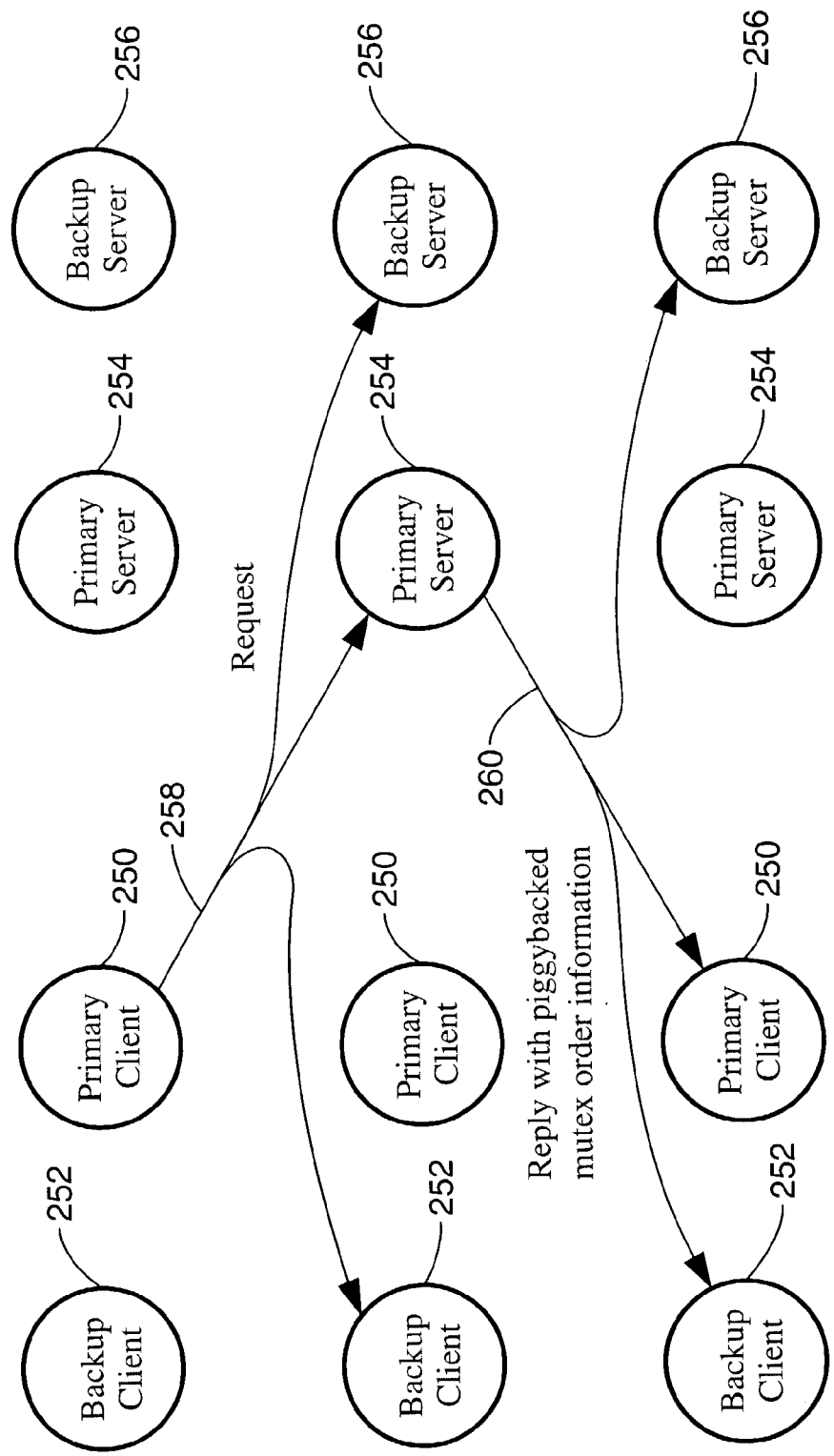
FIG. 4A is a process flow diagram that illustrates a first alternative mechanism for communicating mutex ordering information to the replicas of a process, object or component.
Figure 4B:
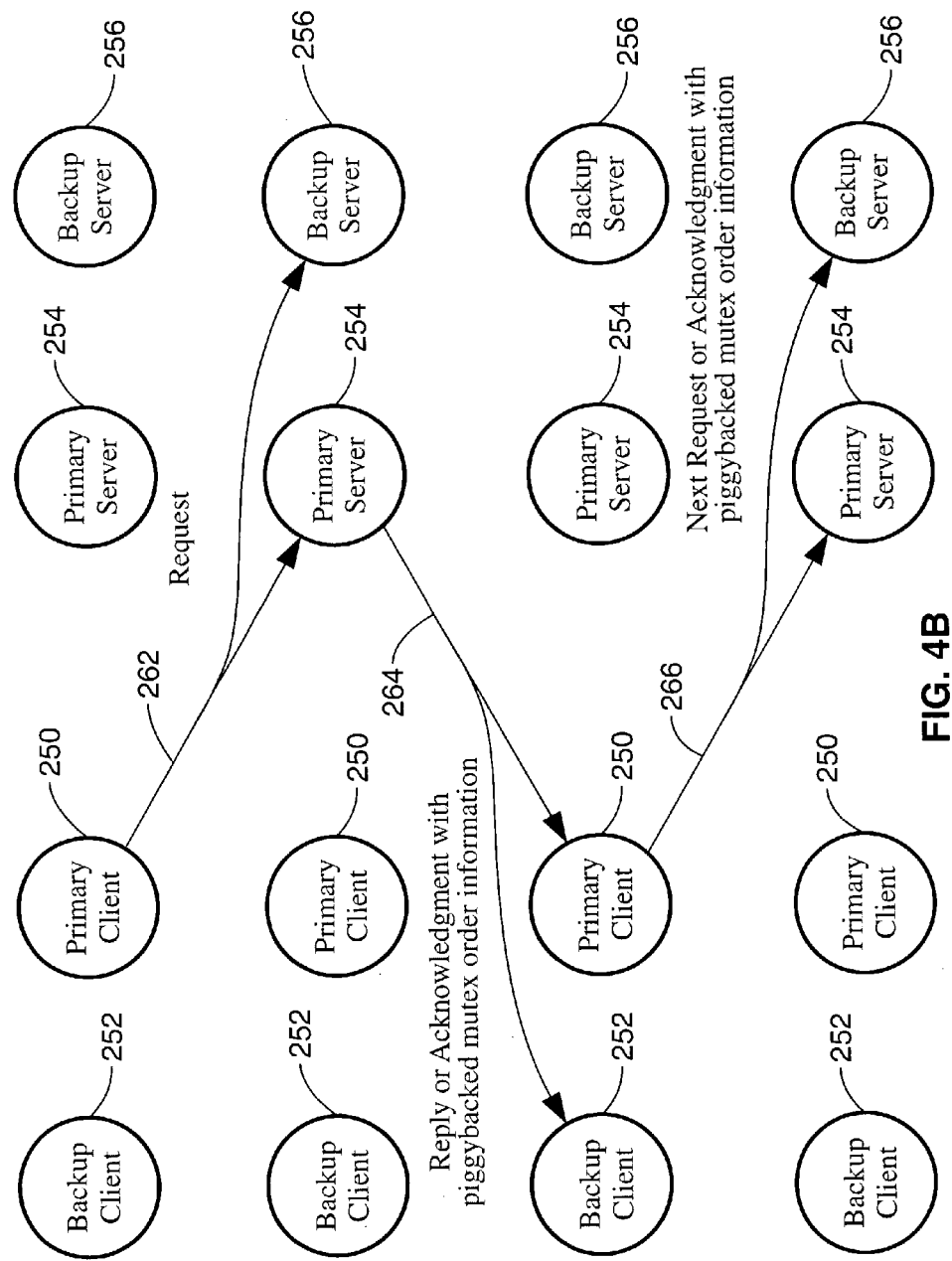
FIG. 4B is a process flow diagram that illustrates a second alternative mechanism for communicating mutex ordering information for the threads in the replicas of a process, object or component.

FIG. 4A and FIG. 4B illustrate two mechanisms by which the information related to the order in which messages are processed and the order in which mutexes are granted to threads, is communicated to the Backup replicas. In FIG. 4A a replicate client is shown with a Primary client replica 250 and a Backup client replica 252. The figure also shows a replicated server with a Primary server replica 254 and a Backup server replica 256. The Primary client sends a request to the replicated server, and the Primary server sends a reply.

The mechanism of FIG. 4A applies when the client and the server communicate using a reliable source-ordered multicast protocol that allows a single multicast message to be delivered to both the client replicas and the server replicas. The Primary client 250 transmits the request message 258 and the Primary server 254 transmits the reply message 260 with mutex ordering information piggybacked on the message. The reply message is delivered to both client replicas 250, 252, and the Backup server replicas, which is shown as a single Backup server replica 256 though generally may be multiple Backup server replicas. If the Primary server 254 fails after transmitting its reply, and the Backup server 256 did not receive the reply, the mechanisms in the Backup server 256 determine the most recent messages that the client replicas 250, 252 received from the Primary server 254 before it failed. The mechanism in the Backup server 256 direct the client replicas to send copies of such messages to the Backup servers so that the Backup servers can obtain the mutex ordering information that they missed. Consequently, the Backup servers obtain the mutex ordering information that they need to ensure that their processing is consistent with that reply.

In general, it may be considered that message delivery in this case comprises delivering of two multicast messages, one message multicast by a first Primary replica to the replicas of other processes, objects or components and one message multicast by a second Primary replica of the other processes, objects or components to the first Primary replica and its Backup replicas The mechanism depicted in FIG. 4B applies when the client and the server communicate using a reliable source-ordered multicast protocol that can address either the client replicas or the server replicas, but not both, in a single transmission. Again, the Primary client 250 transmits a request message 262 and the Primary server 254 transmits the reply message 264 with mutex ordering information piggybacked on the message. The reply message is delivered to only the client replicas. The Primary client 250 then transmits its next request message 266 to the replicated server and that message carries the mutex ordering information reflected back to the server replicas 254, 256. When a Backup server 256 receives that request message, it receives the mutex ordering information for the processing of the prior request message.

If the Primary server 254 fails after transmitting its reply message to the client, and the Backup servers (a single Backup server 256 shown by example while typically multiple Backup servers would exist) do not receive the reply, the Backup servers request the client replicas to send the most recent messages that they received from the Primary server 254 before it failed; thus, the Backup servers 256 obtain the mutex ordering information that they need to ensure that their processing is consistent with that reply.

A similar sequence of messages communicates the mutex ordering information to the Backup servers if the Primary server acts as a client and invokes a method of another server.

As shown in FIG. 4B, if the next request message of the Primary client 250 is delayed, the Primary client will preferably send a control message (acknowledgment) for the reply. Similarly, if the reply message of Primary server is delayed, Primary server 254 preferably sends a control message (acknowledgment) for the request. That control message also carries the mutex ordering information. If a Primary replica accumulates too much mutex ordering information before it generates its next request or reply message, it transmits a control message to carry that information.

Primary Replica Thread Invokes CMT Claim( ) Function to Claim a Mutex

In the Primary replica, when thread T invokes the CMT claim( ) function to claim mutex M, the CMT claim( ) function executes the following steps:

--- determine (T, M, N)
invoke the claim( ) function of the operating system's thread library to claim
    mutex M for thread T
when the claim( ) function of the operating system's thread library grants
    mutex M to thread T
append (T, M, N) to the ordered claims queue of claims to be multicast

---

Figure 5:
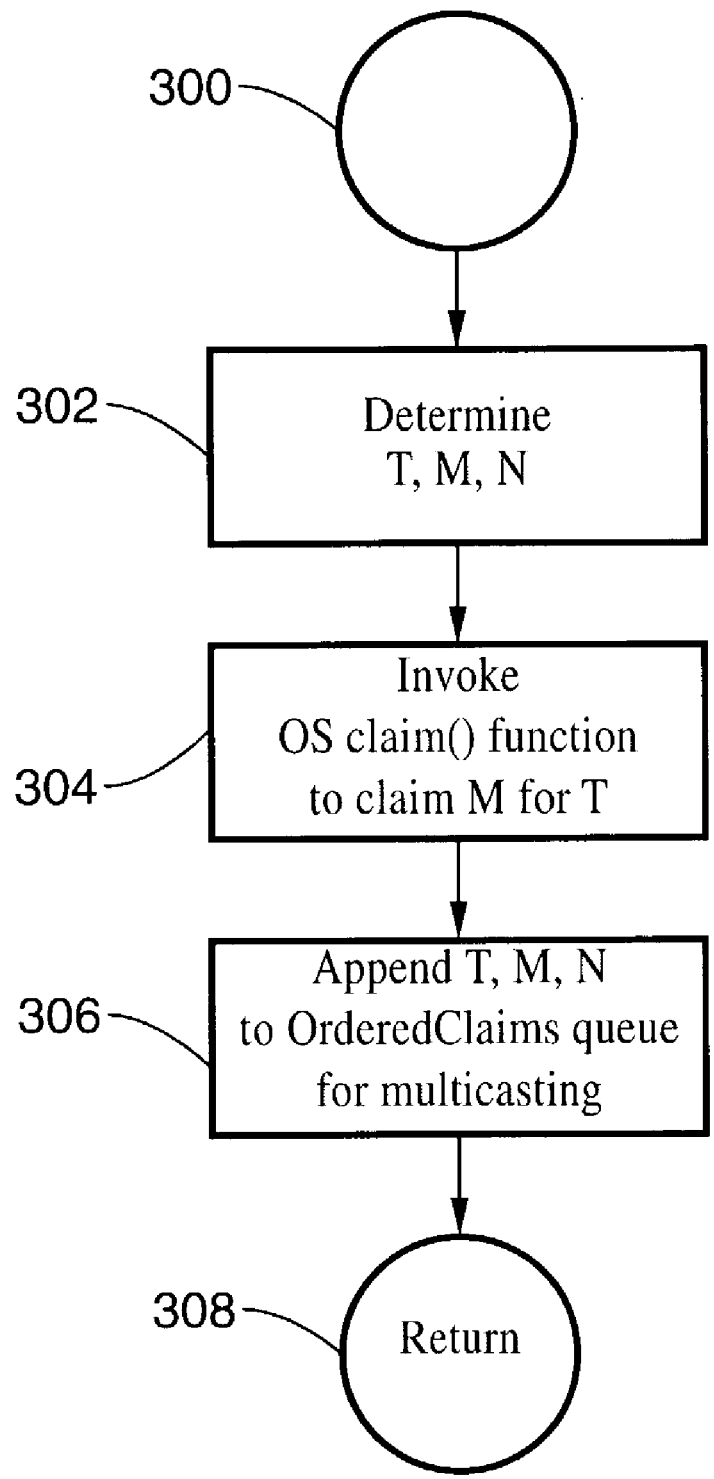
FIG. 5 is a flow chart that shows a thread of the Primary replica invoking the CMT claim( ) function for a mutex and the steps taken by that function when it is invoked.

FIG. 5 illustrates a flowchart of the CMT claim( ) function, when thread T invokes the CMT claim( ) function to claim mutex M, as the Nth claim of T to any mutex, as represented by block 300. The CMT claim( ) function first determines the triple (T, M, N) as per block 302. It then invokes the claim( ) function of the operating system's thread library to claim mutex M for thread T, as in block 304, which allows the standard mutex scheduling mechanisms, such as transfer of priority, to operate.

When the claim( ) function of the operating system's thread library grants mutex M to thread T, which could be sometime later, the CMT claim( ) function appends the triple (T, M, N) to the ordered claims queue of claims to be multicast as depicted in block 306 and then returns to the application program, granting mutex M to thread T and allowing T to proceed as per block 308. If mutex M is held by another thread, thread T will remain suspended until that other thread releases the mutex and the operating system's thread library grants mutex M to thread T.

Primary Replica Multicasts a Message with Piggybacked Ordered Claims

Periodically, or when they transmit a regular message, or when they add an entry to the ordered claims queue, the mechanisms in the Primary replica piggyback the entries of the ordered claims queue onto the message and multicast it, as shown at 98, 100, 114 in FIG. 2.

Primary Replica Thread Invokes CMT Release( ) Function to Release a Mutex

When thread T of the Primary replica invokes the CMT release( ) function to release mutex M, the CMT release( ) function executes the following steps:

---
invoke the release( ) function of the operating system's thread library to
    release mutex M
      (no special actions are required)

---

Figure 6:
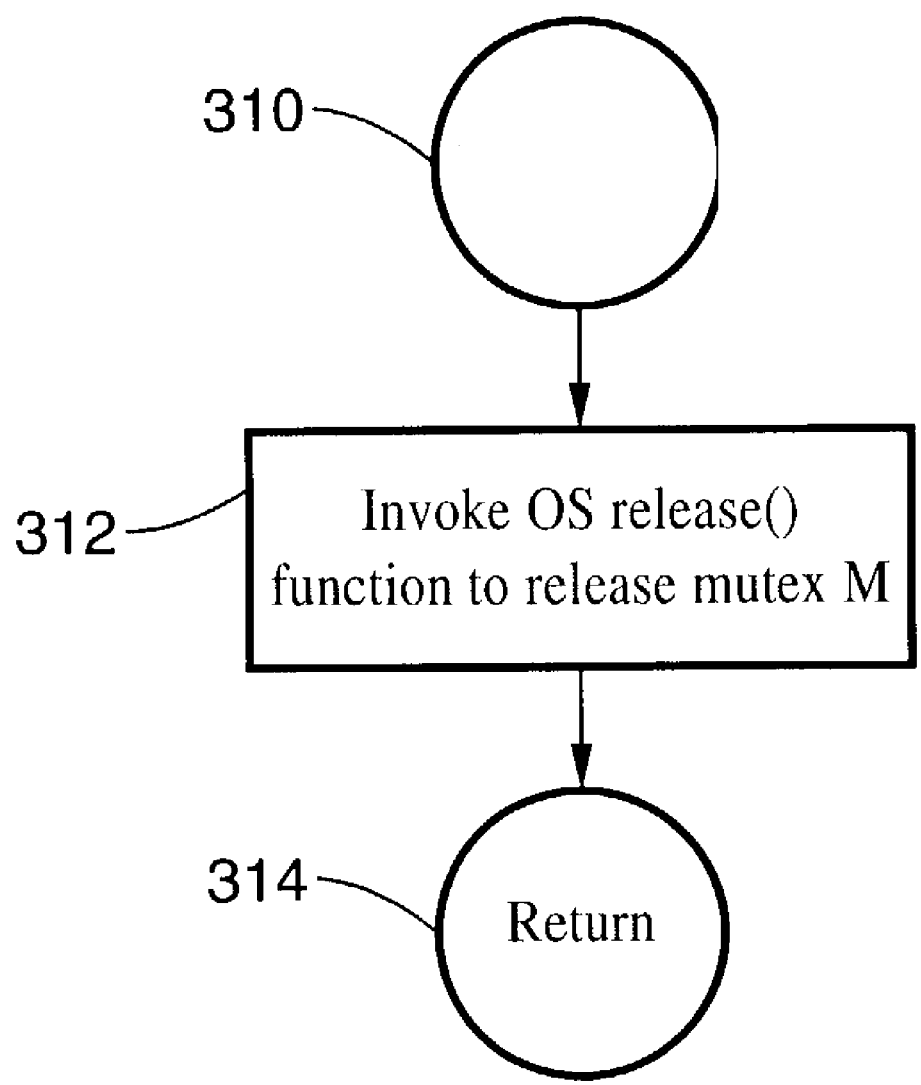
FIG. 6 is a flow chart that shows a thread of the Primary replica invoking the CMT release( ) function for a mutex and the steps taken by that function when it is invoked.

FIG. 6 exemplifies a flowchart for the Primary replica, when thread T invokes the CMT release( ) function as represented by block 310 to release mutex M, the CMT release( ) function invokes the release( ) function of the operating system's thread library to release mutex M at block 312, and returns, allowing thread T to proceed as per block 314. The CMT release( ) function generally requires no other special actions.

Backup Replica Invokes CMT Claim( ) Function to Claim a Mutex

At a Backup replica, when thread T invokes the CMT claim( ) function to claim a mutex M as its Nth claim of any mutex, the CMT claim( ) function executes the following steps:

---
determine (T, M, N)
if (T, N) is the first entry in the M.orderedClaims queue
    set M.available to false
    invoke the claim( ) function of the operating system's thread library
    to claim mutex M for thread T
      if M is available, the operating system grants mutex M to
      thread T immediately
      if M is not available, the operating system makes thread T
      wait for mutex M (which activates the priority transfer
      mechanism)
    when the operating system grants thread T its claim of mutex M
      remove (T, N) from the M.orderedClaims queue
else
    set T.suspended to true
    invoke the suspend( ) function of the operating system's thread
    library to suspend T

---

Figure 7:
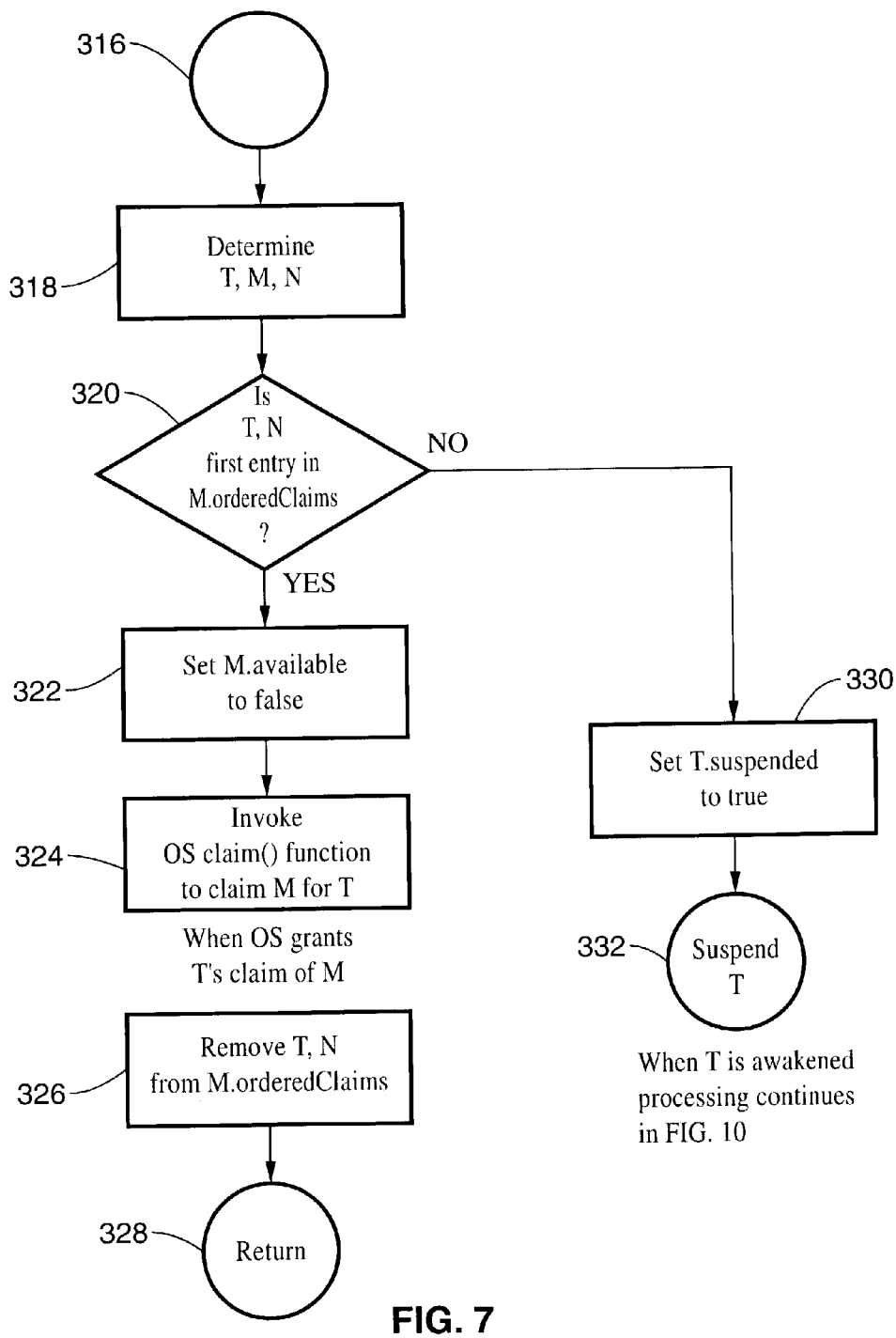
FIG. 7 is a flow chart that shows a thread of a Backup replica invoking the CMT claim( ) function for a mutex and the steps taken by that function when it is invoked.

FIG. 7 exemplifies a flowchart of the claim function at a Backup replica. When thread T invokes the CMT claim( ) function as represented by block 316 for mutex M, the CMT claim( ) function first determines (T, M, N) as per block 318.

It then checks whether (T, N) is the first entry in the M.orderedClaims queue 320. If (T, N) is the first entry, it sets M.available to false as per block 322 and invokes the claim( ) function of the operating system's thread library to claim mutex M for thread T as depicted at block 324.

When thread T is granted its claim of mutex M, the CMT claim( ) function removes (T, N) from the M.orderedClaims queue as block 326 and returns at block 328. Otherwise, if (T, N) is not the first entry in the M.orderedClaims queue, the CMT claim( ) function sets T.suspended to true as represented by block 330 and invokes the suspend( ) function of the operating system's thread library to suspend thread T as per block 332.

Backup Replica Invokes the CMT Release( ) Function to Release a Mutex

When thread T invokes the CMT release( ) function to release mutex M, the CMT release( ) function executes the following steps:

---
invoke the release( ) function of the operating system's thread library to
    release mutex M
set M.available to true
if the M.orderedClaims queue is not empty
    determine the first entry (T', N') in the M.orderedClaims queue
    if T'.suspended
      invoke the signal( ) function of the operating system's thread
      library
      to awaken thread T'

---

Figure 8:
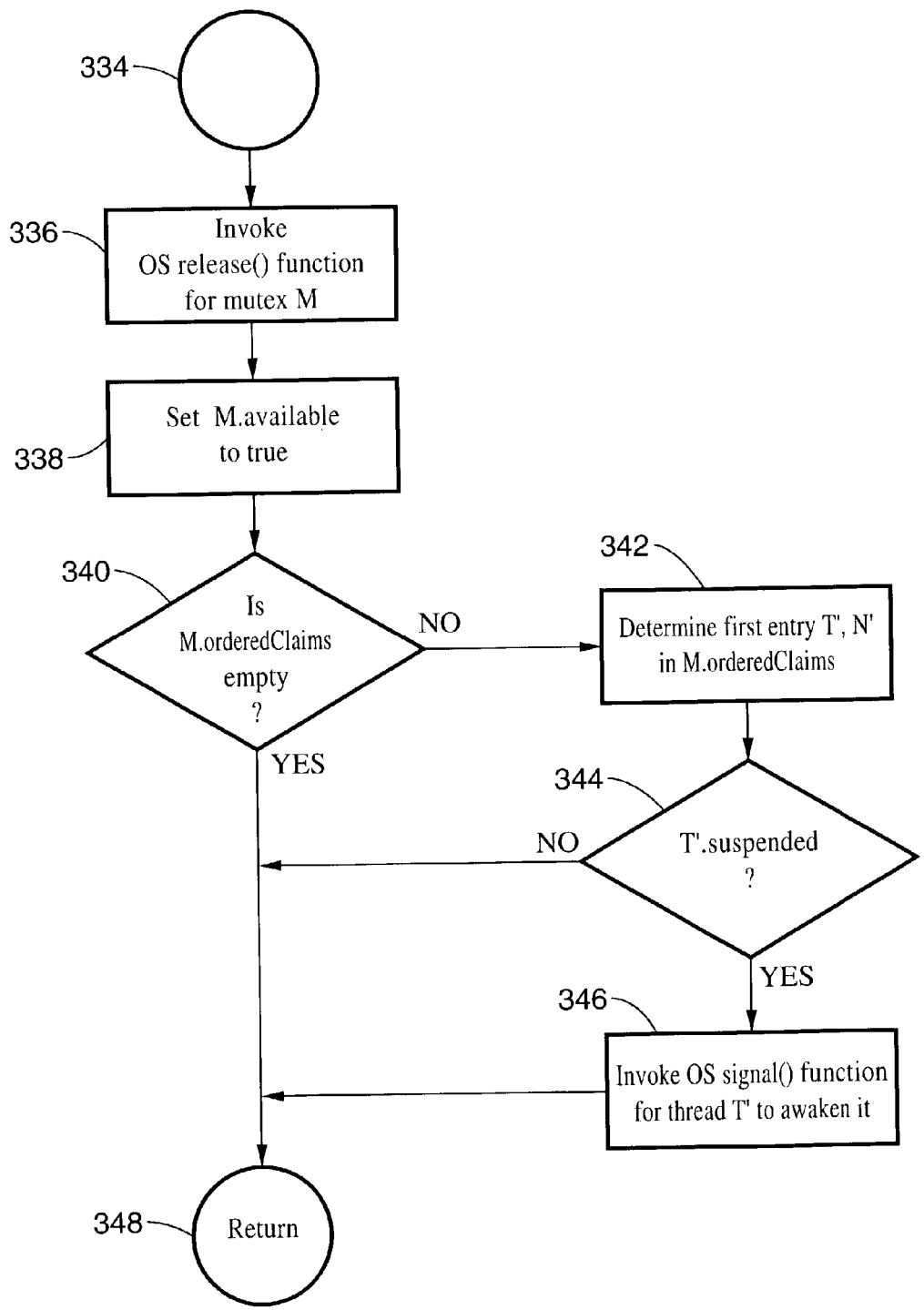
FIG. 8 is a flow chart that shows a thread of a Backup replica invoking the CMT release( ) function for a mutex and the steps taken by that function when it is invoked.

FIG. 8 is a flowchart exemplifying a thread in a Backup replica invoking the CMT release( ) function to release mutex M, as represented by block 334, the CMT release( ) function invokes the release( ) function of the operating system's thread library as per block 336 to release mutex M and sets M.available to true at block 338. It then checks whether the M.orderedClaims queue is empty as represented by block 340. If the M.orderedClaims queue is not empty, it determines the first entry (T', N') in the M.orderedClaims queue as depicted by block 342. It then checks whether thread T' is suspended at block 344. If T' is suspended, it invokes the signal( ) function of the operating system's thread library to awaken thread T' as per block 346 and then returns at block 348. If the M.orderedClaims queue is empty, it simply returns.

Backup Replica Receives Ordered Claims Piggybacked on a Message

When a Backup replica receives ordered claims piggybacked on a message, the consistent multithreading message handler extracts, in order, each ordered claim (T, M, N) from the message and then executes the following steps:

---
append (T, N) to the M.orderedClaims queue
if M.available and T.suspended
    invoke the signal( ) function of the operating system's thread
    library
    to awaken T

---

FIG. 9 is a flowchart exemplifying a Backup replica receiving ordered claims piggybacked on a message as represented by block 350. For each entry (T, M, N), extracted from the ordered claims in the message, the CMT message handler appends (T, N) to the M.orderedClaims queue as per block 352. It then checks whether (T, N) is the first entry in the M.orderedClaims queue 354. If (T, N) is the first entry in the M.orderedClaims queue, it checks whether mutex M is available as depicted by block 356 and whether thread T is suspended as represented by block 358. If the mutex is available and the thread is suspended, the signal( ) function of the operating system's thread library is invoked to awaken thread T as depicted by block 360 and it terminates at block 362. If (T, N) is not the first entry in the M.orderedClaims queue or if the availability and suspension conditions are not true, then termination immediately occurs at block 362.

Backup Replica Thread is Awakened

When a thread T is awakened while waiting for mutex M as its Nth claim of any mutex, the CMT claim( ) function executes the following steps:

```
if M.available and (T, N) is the first entry in the M.orderedClaims
queue
    set T.suspended to false
    set M.available to false
    invoke operating system's claim( ) function to claim mutex M for T
        if mutex M is available, the operating system grants mutex M
            to thread T immediately
        if mutex M is not available, the operating system makes
            thread T wait for mutex M
        (which activates the priority transfer mechanism)
            when the operating system grants mutex M to thread T
            remove (T, N) from the M.orderedClaims queue
            resume thread T
else
    set T.suspended to true
    invoke the suspend( ) function of the operating system's thread
        library to suspend thread T
```

Figure 10:
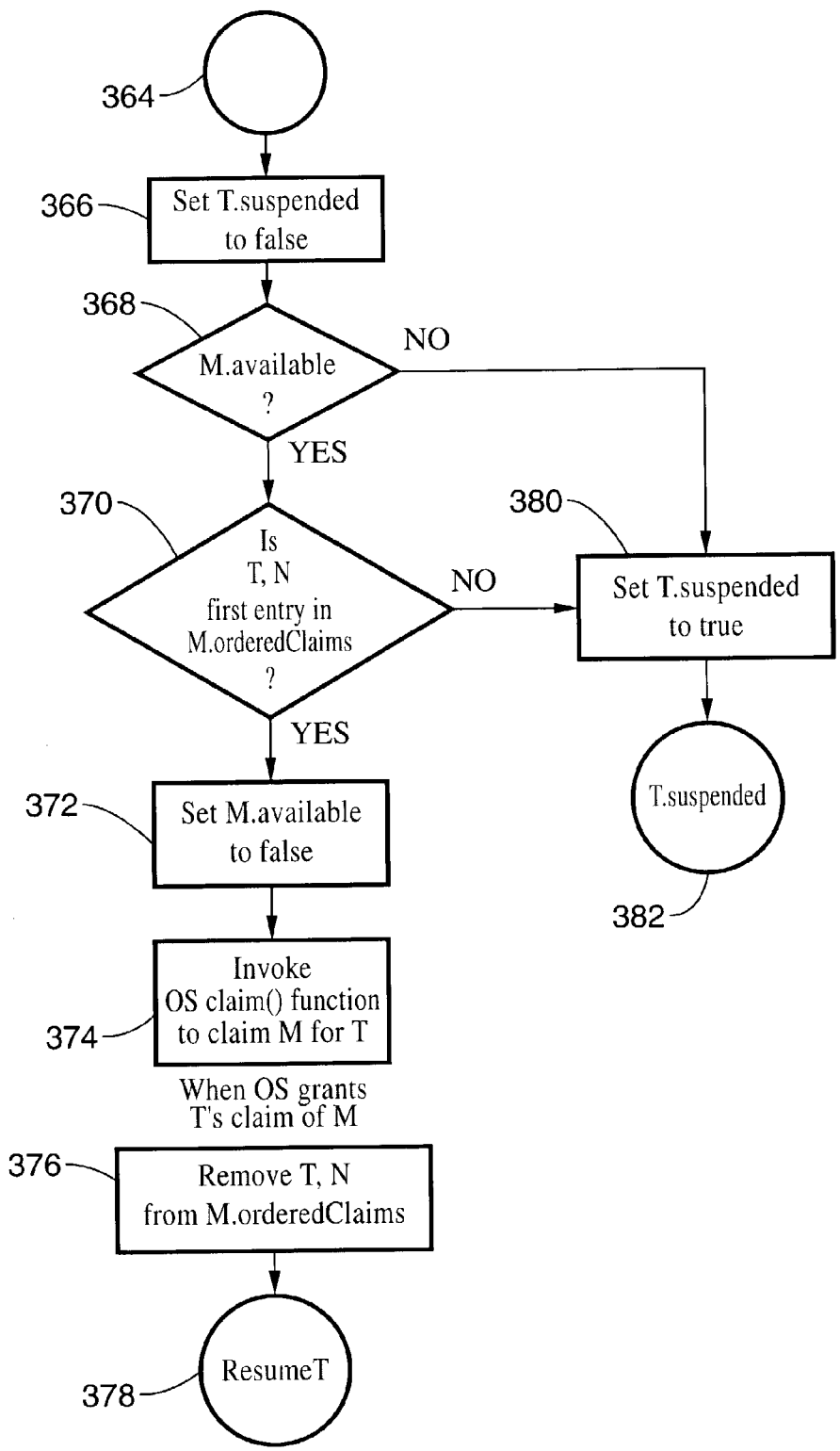
FIG. 10 is a flow chart that shows a thread of a Backup replica that is awakened while waiting for a mutex and the steps taken by the CMT claim( ) function.

FIG. 10 is a flowchart exemplifying a thread T of a Backup replica being awakened while waiting for mutex M as its Nth claim of any mutex as shown commencing at block 364. The CMT claim( ) function sets T.suspended to false as per block 366, checks whether the mutex M is available at block 368, and then checks whether (T, N) is the first entry in the M.orderedClaims queue as depicted at block 370. If mutex M is available and (T, N) is the first entry in the M.orderedClaims queue, then M.available is set to false at block 372. The claim( ) function from the operating system's thread library is invoked as depicted at block 374 to claim mutex M. When the operating system grants the claim for mutex M to thread T, the CMT claim( ) function removes (T, N) from the M.orderedClaims queue as per block 376 and resumes thread T at block 378. If the mutex M is not available as determined at block 368, or if (T, N) is not the first entry in the M.orderedClaims queue as determined at block 370, the CMT claim( ) function sets T.suspended to true as per block 380, and invokes the suspend( ) function of the operating system's thread library to suspend thread T as per block 382.

As can be seen, therefore, The present invention provides a system, software mechanisms, methods improvements and apparatus for determining the order in which shared resources are accessed by threads in multiple replicas, in a computer environment in which multithreaded application programs are replicated using the semi-active or passive replication strategies which are based on the leader-follower (primary-backup) approach. The invention generally exemplifies generating an order in which claims to mutual exclusion constructs (mutexes) are granted to threads in the Primary replica, and is communicated to the Backup replicas for constraining the granting of resource claims, so as to accord with the grant order of the Primary replica. Numerous aspects of the invention, preferred embodiments, and optional aspects are described. It will be appreciated that the present invention may be practiced in various embodiments, such as having differing levels of complexity and utilizing different routines and structures while still adhering to the patentable aspects of the present invention.

As can also be seen, the system, software mechanisms, methods improvements and apparatus for maintaining strong replica consistency are readily applied to both new and existing applications. They are applicable to computing environments that can execute replicated multithreaded application programs and are particularly well-suited to distributed systems having multiple computers, hosting Primary and Backup replicas, connected by a local-area or wide-area network. The system, software mechanisms, methods, improvements and apparatus may be used to replicate processes, objects, components and other software entities. In reference to software, the present system, software mechanisms, methods, improvements and apparatus may be supplied as a computer readable media, or other distribution form, containing program code and/or data associated with the described invention recited in the claims.

The preceding descriptions of functions, according to the present invention for ordering access to shared resources to threads within Primary and Backup replicas, has been embodied within functions contained in a Consistent Multithreading library that preferably intercepts calls to the operating system's thread library; however, it should be appreciated that the functions of the present invention may be incorporated, alternatively, into the operating system's thread library, or be otherwise configured without departing from the teachings of the present invention.

The description above has described functions and mechanisms that provide virtual determinism and strong replica consistency when multiple multithreaded application replicas are being executed. It should be appreciated that these functions and mechanisms may be modified in a number of different ways, and/or be implemented with reduced functionality, or added functionality, by one of ordinary skill in the art without departing from the present invention.

Queue based ordering and granting of mutex claims is described by way of example as a mechanism for ordering claims and suspending threads awaiting a mutex; however, it should be appreciated that any other convenient locking, tagging, or similar ordering means can be utilized, in combination with communication of such claims, by one of ordinary skill without departing from the teachings of the present invention.

The ordering and granting of claims to access shared resources by Backup replicas is described by way of example to use the delivery order of multicast messages from a Primary replica. However, other mechanisms may be utilized for communicating ordering information across a number of replicas as may be implemented by one of ordinary skill in the art without departing from the teachings of the present invention.

Multicast messages are exemplified containing thread, mutex and claim number information (T, M, N), wherein mutex claims may be distinguished from one another; however, it should be appreciated that claims may be distinguished from one another using alternative mechanisms and/or data structures, without departing from the teachings of the present invention. In a similar manner, the entries in a claims queue for a particular mutex are exemplified as containing fields for thread and claim number (T, N), wherein alternative means for distinguishing one claim from another may be adopted without departing from the teachings of the present invention. In the above situations, it should also be appreciated that fields may be added to the above claim descriptions to enhance functionality, or to accommodate additional enhancements and/or modifications to the described systems, software mechanisms, methods, improvements and apparatus, without departing from the present invention.

The use of multicast messages with piggybacked ordering information has been described for general use; however, messages may be delivered utilizing any convenient mechanism, such as message multicasting of a separate message (i.e. control message) containing the ordering information under select situations, or point-to-point messages, to communicate the ordering and granting of claims to multiple replicas.

The invention may be described as addressing the problem of maintaining strong replica consistency of replicated multithreaded application programs that employ the leader-follower (primary-backup) strategy of semi-active or passive replication, by masking multithreading as a source for non-determinism, and thus rendering a replicated multithreaded application program virtually deterministic, in a manner that is transparent to the application program.

To provide virtual determinism and to maintain strong replica consistency, the Primary replica determines the order in which accesses to shared resources are granted to threads in the Backup replicas, which is the same order as the corresponding accesses were granted to the corresponding threads in the Primary replica. In the Primary replica, when a request to access a shared resource is ordered and granted to a thread, the Primary replica multicasts a message containing the ordering and granting information to the Backup replicas. In a Backup replica, when a thread requests access to a shared resource, and when the multicast protocol orders and delivers a message containing the access request information from the Primary replica, and when the shared resource is available, the request is granted to the thread in the Backup replica.

To maintain transparency to the application program, the invention intercepts the calls to functions of the operating system's thread library and diverts them to a Consistent Multithreading library that is interposed ahead of the operating system's thread library. The Consistent Multithreading library contains wrapper functions of the functions of the operating system's thread library that claim and release mutexes, semaphores, condition variables, and so forth. When the Primary or Backup replicas invoke functions to claim or release shared resources, they invoke the wrapper functions of the Consistent Multithreading library, which sanitize the non-determinism due to multithreading that would otherwise exist and, in turn, invoke the corresponding functions of the operating system's thread library. Thus, the invention ensures that the Primary and Backup replicas make the same decisions when those functions are invoked, in a manner that is transparent to the application program.

Although the description above contains many specificities, these should not be construed as limiting the scope of the invention but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem that the present invention seeks to solve, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for replicating a multithreaded application program using a semi-active or passive replication strategy, wherein said application program executes under the control of an operating system having a thread library, the method comprising:
   at a Primary replica, piggybacking mutex ordering information onto regular multicast messages specifying the order in which threads in the Primary replica have been granted their claims to mutexes; and
   at a Backup replica, receiving said messages containing said mutex ordering information which determines the order in which threads in said Backup replica are granted mutexes;
   wherein said messages are multicast according to a protocol that delivers messages reliably and in the same order from the Primary replica to said Backup replicas.

2. A method for replicating a multithreaded application program using a semi-active or passive replication strategy, wherein said application program executes under the control of an operating system having a thread library, the method comprising:
   at a Primary replica, piggybacking mutex ordering information onto regular multicast messages specifying the order in which threads in the Primary replica have been granted their claims to mutexes; and
   at a Backup replica, receiving said messages containing said mutex ordering information which determines the order in which threads in said Backup replica are granted mutexes;
   wherein strong replica consistency is maintained without
      counting the number of instructions between non-deterministic events,
      additional messages for claiming, granting and releasing each mutex, and
      risk that a result might be communicated to a client but the Backup replicas might lack ordering information necessary for reproducing said result.

3. A method as recited in claim 1 or 2, further comprising:
   employing thread library interpositioning to intercept calls to functions in the operating system's thread library.

4. A method comprising: for replicating a multithreaded application program using the semi-active or passive replication strategy, wherein said application program executes under the control of an operating system having a thread library, the method comprising:
   employing thread library interpositioning to intercept calls to functions in the operating system's thread library to render said application program virtually deterministic;
   at a Primary replica, piggybacking mutex ordering information onto regular multicast messages specifying the order in which threads in the Primary replica have been granted their claims to mutexes; and
   at a Backup replica, receiving said messages that determine the order in which threads in said Backup replica are granted mutexes.

5. A method for replicating a multithreaded application program using the leader-follower strategy of semi-active or passive replication, wherein said application program executes under the control of an operating system having a thread library, the method comprising:

at a Primary replica, piggybacking mutex ordering information onto regular multicast messages specifying the order in which threads in the Primary replica have been granted mutexes;

at a Backup replica, receiving said messages that determine the order in which threads in said Backup replica are to claim mutexes; and employing thread library interpositioning to intercept calls to functions in the operating system's thread library for performing said piggybacking and for controlling said order in which threads in said Backup replica are granted their claims to mutexes.

6. A method as recited in claim 5, wherein if the Primary replica does not have a regular message to multicast, it multicasts a control message containing said mutex ordering information.

7. A method as recited in claim 5, wherein a thread in said Backup replica is not allowed to claim a given mutex, for a given claim, until said Backup replica receives a multicast message that contains said mutex ordering information for said claim from said Primary replica.

8. A method for replicating a multithreaded application program using a semi-active or passive replication strategy, wherein said application program executes under the control of an operating system having a thread library, the method comprising:

providing a consistent multithreading library that is interposed ahead of said operating system's thread library so that calls to functions of the operating system's thread library can be intercepted to render said application program virtually deterministic;

said virtual determinism enables strong replica consistency to be maintained;

said consistent multithreading library contains wrapper functions for intercepting calls to functions in said operating system's thread library;

said application program invokes said wrapper functions of said consistent multithreading library instead of the corresponding functions of said operating system's thread library; and wherein in response to a Primary replica invoking a function of said consistent multithreading library to claim a mutual exclusion construct (mutex), said function invokes the corresponding function of the operating system's thread library to claim said mutex and piggybacks mutex ordering information onto regular messages multicast to Backup replicas.

9. A method as recited in claim 8, wherein the invocation of a claim function to claim a mutex by a thread in said Primary replica comprises invoking a claim function of said consistent multithreading library and subsequently piggybacking ordering information onto the next message multicast.

10. A method as recited in claim 8, wherein said consistent multithreading library mechanisms allow concurrency of threads that do not simultaneously acquire a same mutex.

11. A method as recited in claim 8
wherein if the application program runs on an operating system that provides Dynamically Linked Libraries (DLL), the DLL mechanisms are used to interpose the consistent multithreading library ahead of said operating system's thread library; and wherein said interpositioning causes the application program to invoke said functions of said consistent multithreading library, instead of the corresponding functions of said operating system's thread library.

12. A method as recited in claim 11, further comprising inserting a command into the makefile for said application program directing the linker to interpose said consistent multithreading library ahead of said operating system's thread library.

13. A method for replicating a multithreaded application program using a semi-active or Passive replication strategy, wherein said application program executes under the control of an operating system having a thread library, the method comprising:

providing a consistent multithreading library that is interposed ahead of said operating system's thread library so that calls to functions of the operating system's thread library can be intercepted to render said application program virtually deterministic; and communicating mutex ordering information as messages from said primary replica to said Backup replica specifying the order in which threads in said Primary replica have been granted mutexes to establish the order in which threads in said Backup replica are to claim mutexes;

wherein said message are communicated using a reliable source-ordered multicast group communication protocol;

wherein said multicast protocol delivers messages reliably and in the same source-order to the Backup replicas;

wherein said mutexes are granted in the same source-order to the threads at said Backup replicas; and wherein said communicating mutex ordering information comprises piggybacking mutex ordering information onto regular multicast messages.

14. A method as recited in claim 13, wherein if the Primary replica does not have a regular message to multicast, it multicasts a control message containing said mutex ordering information.

15. A method as recited in claim 13, wherein said communicating said mutex ordering information comprises multicasting two messages, one message multicast by a first Primary replica to the replicas of other processes, objects or components and another message multicast by a second Primary replica of said other processes, objects or components to first said Primary replica and its Backup replicas.

16. A method of achieving strong replica consistency for a replicated multithreaded application programs using the semi-active or passive replication strategy, comprising:

sanitizing multithreaded application programs by masking multithreading as a source of non-determinism to render said replicated multithreaded application program virtually deterministic wherein said sanitizing comprises:
piggybacking mutex ordering information onto regular multicast messages from a Primary replica that specifies the order in which threads in the Primary replica have been granted mutexes; and
delivering said messages to a Backup replica that determine the order in which threads in said Backup replica are granted the mutexes that they claim.

17. A method as recited in claim 16, wherein said delivering of messages comprises delivering of two multicast messages, one message multicast by a first Primary replica to the replicas of other processes, objects or components and one message multicast by a second Primary replica of said other processes, objects or components to first said Primary replica and its Backup replicas.

18. A method as recited in claim 16, wherein said delivering using a reliable source-ordered multicast group communication protocol to deliver messages from the Primary replica to the Backup replica.

19. A method as recited in claim 16, further comprising employing thread library interpositioning to intercept calls to functions of the operating system's thread library for performing said piggybacking and for controlling said order in which threads in said Backup replica are granted the mutexes that they claim.

20. A method as recited in claim 19, wherein a thread T in said Backup replica is not allowed to claim a given mutex M, for a given Nth time that thread T has claimed any mutex, until it receives said message from said Primary replica that contains the ordering information (T, M, N).

21. A method of achieving strong replica consistency for a replicated multithreaded application programs using the semi-active or passive replication strategy, comprising:
sanitizing multithreaded application programs by masking multithreading as a source of non-determinism to render said replicated multithreaded application program virtually deterministic;
wherein if said Primary replica does not have a regular message to multicast, it multicasts a control message containing said mutex ordering information.

22. A method for replicating a multithreaded application program using a semi-active or passive replication strategy, wherein said application program executes under the control of an operating system, said method comprising:
using a multicast group communication protocol to render the multithreaded application program virtually deterministic;
said virtual determinism enables strong replica consistency to be maintained;
intercepting calls to the functions of the operating system's thread library; and
multicasting ordering information from said Primary replica to said Backup replicas, regarding the order in which threads in the Backup replicas are to be granted their claims to mutexes;
wherein said multicasting of ordering information comprises piggybacking said ordering information onto regular messages that are multicast from said Primary replica to said Backup replicas.

23. A method as recited in claim 22, further comprising:
using a mutex to protect shared resources accessed by threads in said application program;
wherein said threads are granted access to said shared resources in the same order at the replicas of said application program.

24. A method as recited in claim 22, wherein said ordering information describes the order in which threads in said Primary replica are granted their claims to mutexes and which is delivered reliably and in the same order to said Backup replicas.

25. A method as recited in claim 22, wherein said means of multicasting and piggybacking said ordering information uses two multicast messages, one message multicast by first said Primary replica to the replicas of other processes, objects or components and one message multicast by second Primary replica of said other processes, objects or components to first said Primary replica and its Backup replicas.

26. A method as recited in claim 22, wherein if said Primary replica does not have a regular message to multicast, it multicasts a control message containing said ordering information.

27. A method as recited in claim 22, further comprising:
maintaining strong replica consistency and application transparency by interpositioning a consistent multithreading library ahead of the operating system's thread library and intercepting calls to functions in said operating system's thread library.

28. A method as recited in claim 27,
wherein functions of said operating system's thread library are wrapped by functions of said consistent multithreading library;
wherein the application program invokes the wrapper functions of said consistent multithreading library, instead of the corresponding functions of said operating system's thread library, thereby maintaining strong replica consistency and application transparency.

29. A method as recited in claim 28, wherein said wrapping is performed by dynamically linking said consistent multithreading library to said application program.

30. A software mechanism, embodied on a computer readable medium, program using a semi-active or passive replication strategy, wherein said application program executes under the control of an operating system having a thread library, the mechanism comprising:
control program code;
said control program code at a Primary replica, being configured to piggyback mutex ordering information onto regular multicast messages for specifying the order in which threads in the Backup replicas are granted their claims to mutexes;
said control program code configured to deliver said control messages using a multicast group communication protocol that delivers the messages in an order that determines the order in which the threads in different replicas are granted their claims to mutexes.

31. A software mechanism as recited in claim 30, further comprising a consistent multithreading library containing said control program code that is interpositioned for intercepting calls to functions of the operating system's thread library.

32. A software mechanism, embodied on a computer readable medium, replicating a multithreaded application program using a semi-active or passive replication strategy, wherein said application program executes under the control of an operating system having a thread library, the mechanism comprising:
a consistent multithreading library that is interposed ahead of the operating system's thread library so that calls to functions of said operating system's thread library can be intercepted to render said application program virtually deterministic;
said virtual determinism enables strong replica consistency to be maintained;
said consistent multithreading library contains wrapper functions for intercepting calls to functions of said operating system's thread library;
said application program invokes said wrapper functions of said consistent multithreading library instead of the corresponding functions of said operating system's thread library;
wherein when a Primary replica invokes a function of the consistent multithreading library to claim a mutex, said consistent multithreading library function invokes the corresponding function of said operating system's thread library and subsequently piggybacks ordering information onto the next message that it multicasts.

33. A software mechanism as recited in claim 32, wherein said multicasting said ordering information uses two multicast messages, one message multicast by first said Primary replica to the replicas of other processes, objects or components and one message multicast by second Primary replica of said other processes, objects or components to first said Primary replica and its Backup replicas.

34. A software mechanism as recited in claim 32, wherein if said Primary replica does not have a regular message to multicast, it multicasts a control message containing said ordering information.

35. A software mechanism as recited in claim 34, wherein said message is multicast using a reliable source-ordered multicast group communication protocol.

36. A software mechanism as recited in claim 35:
wherein said source-ordered multicast protocol delivers messages reliably and in the same source order from the Primary replica to the Backup replicas; and
wherein the mutexes are granted in the same order to the threads in the Backup replicas as in the Primary replica, as dictated by the ordering information piggybacked within said messages.

37. A software mechanism as recited in claim 32:
wherein if the application program runs on an operating system that provides Dynamically Linked Libraries (DLL), the dynamic linking mechanisms are used to interpose the consistent multithreading library ahead of the operating system's thread library; and
wherein said interpositioning causes the application program to invoke the functions of the consistent multithreading library, rather than the corresponding functions of the operating system's thread library.

38. A software mechanism as recited in claim 32, further comprising dynamically linking said consistent multithreading library to said application program and interposing said consistent multithreading library ahead of said operating system's thread library to maintain transparency to the application program and the operating system.

39. A software mechanism, embodied on a computer readable medium, achieving strong replica consistency using a semi-active or passive replication strategy for replicating multithreaded application programs, comprising:
control program code configured to sanitize multithreaded application programs by masking multithreading as a source of non-determinism;
library interpositioning of said control program code to intercept calls to functions of the operating system's thread library for sanitizing said multithreaded application programs;
wherein when a Primary replica invokes a wrapper function of said consistent multithreading library to claim a mutex, said consistent multithreading library function invokes the corresponding function of said operating system's thread library and then piggybacks ordering information onto the next message that it multicasts to the Backup replicas.

40. A software mechanism as recited in claim 39, wherein said control program code comprises a consistent multithreading library containing wrapper functions for said functions of said operating system's thread library that claim and release mutexes.

41. A software mechanism as recited in claim 39, wherein said multicasting uses two multicast messages, one message multicast by first said Primary replica to the replicas of other processes, objects or components and one message multicast by second Primary replica of said other processes, objects or components to first said Primary replica and its Backup replicas.

42. A software mechanism as recited in claim 39, wherein if said Primary replica does not have a regular message to multicast, it multicasts a control message containing said ordering information.

43. A software mechanism, embodied on a computer readable medium, replicating a multithreaded application program using a semi-active or passive replication strategy, wherein said application program executes under the control of an operating system having a thread library, the mechanism, comprising
a consistent multithreading library that is interposed ahead of said operating system's thread library;
said consistent multithreading library contains wrapper functions for functions of said operating system's thread library;
said wrapper functions ensure that the threads in the replicas are granted their claims to mutexes in the same order, and similarly for releasing mutexes;
said application program invokes the wrapper functions of said consistent multithreading library instead of the corresponding functions in said operating system's thread library; and
wherein when a Primary replica invokes a function of said consistent multithreading library to claim a mutex, said function invokes the claim function of the operating system's thread library and subsequently piggybacks mutex ordering information onto the next regular message that it multicasts.

44. A software mechanism as recited in claim 43, wherein said regular message is multicast using a reliable source-ordered multicast group communication protocol.

45. A software mechanism as recited in claim 44:
wherein said multicast protocol delivers messages reliably and in the same source order from the Primary replica to said Backup replicas; and
wherein the mutexes are granted in the same order to the threads in said Backup replicas as dictated by the mutex ordering information piggybacked onto said multicast messages.

46. A software mechanism as recited in claim 45, wherein said granting of mutexes in the same order maintains strong replica consistency.

47. A software mechanism as recited in claim 46, wherein said multicasting uses two multicast messages, one message multicast by first said Primary replica to the replicas of other processes, objects or components and one message multicast by second Primary replica of said other processes, objects or components to first said Primary replica and its Backup replicas.

48. A software mechanism as recited in claim 47, wherein if said Primary replica does not have a regular message to multicast, it multicasts a control message containing said mutex ordering information.

49. A software mechanism as recited in claim 43:
wherein if the application program runs on an operating system that provides Dynamically Linked Libraries, the dynamic linking mechanisms are used to interpose the consistent multithreading library ahead of the operating system's thread library; and
wherein said interpositioning causes the application program to invoke the functions of said consistent multithreading library, rather than the corresponding functions of said operating system's thread library.

50. A software mechanism as recited in claim 43, further comprising dynamically linking said consistent multithreading library to said application program and interposing said consistent multithreading library ahead of said operating system's thread library to maintain transparency to the application program and the operating system.

51. A software mechanism, embodied on a computer readable medium, replicating a multithreaded application program using a semi-active or passive replication strategy, wherein said application program executes under the control of an operating system, said mechanism comprising:

control program code;

said control program code configured to use mutex ordering information piggybacked on regular messages multicast by a source-ordered group communication Protocol from the Primary replica, which dictates the order in which the threads in the Backup replicas are granted their claims to mutexes, to render the replicated multithreaded application program virtually deterministic;

wherein if said Primary replica does not have a regular message to multicast, it multicasts a control message containing said mutex ordering information.

52. A software mechanism, embodied on a computer readable medium, replicating a multithreaded application program using a semi-active or passive replication strategy, wherein said application program executes under the control of an operating system, said mechanism comprising:

control program code;

said control program code configured to use mutex ordering information piggybacked on regular messages multicast by a source-ordered group communication protocol from the Primary replica, which dictates the order in which the threads in the Backup replicas are granted their claims to mutexes, to render the replicated multithreaded application program virtually deterministic;

said control program code is configured to intercept calls to the operating system's thread library;

wherein strong replica consistency and application transparency are maintained by interpositioning said consistent multithreading library ahead of said operating system's thread library and intercepting calls to functions of said operating system's thread library;

wherein said functions of said operating system's thread library are wrapped by functions of said consistent multithreading library; and wherein said application program invokes the wrapper functions of said consistent multithreading library, instead of the corresponding functions of said operating system's thread library, thereby maintaining strong replica consistency and application transparency.

53. A software mechanism, embodied on a computer readable medium, replicating a multithreaded application program using a semi-active or passive replication strategy, wherein said application program executes under the control of an operating system, said mechanism comprising:

control program code;

said control program code configured to use mutex ordering information piggybacked on regular messages multicast by a source-ordered group communication protocol from the Primary replica, which dictates the order in which the threads in the Backup replicas are granted their claims to mutexes, to render the replicated multithreaded application program virtually deterministic;

wherein said control program code is configured to allow concurrent processing of threads that do not claim the same mutex simultaneously and threads that claim different mutexes; and wherein strong replica consistency is maintained.

54. A software mechanism, embodied on a computer readable medium, replicating a multithreaded application program using a semi-active or passive replication strategy, wherein said application program executes under the control of an operating system, said mechanism comprising:

control program code;

said control program code configured to use mutex ordering information piggybacked on regular messages multicast by a source-ordered group communication protocol from the Primary replica, which dictates the order in which the threads in the Backup replicas are granted their claims to mutexes, to render the replicated multithreaded application program virtually deterministic;

wherein said control program code is configured to allow threads to communicate with each other by multicasting messages;

wherein said control program code is configured to allow threads to use shared resources; and wherein strong replica consistency of the different replicas is maintained.

55. A system for executing threads that share resources, within a computing environment that supports semi-active or passive replication of multithreaded application programs, comprising:

means for identifying requests for accesses to shared resources by threads in the Primary replica;

means for communicating to one or more Backup replicas the order in which said requests are granted to threads in said Primary replica; and means for ordering and granting requests for accesses to shared resources by threads in a Backup replica, in response to the order in which corresponding requests were granted to threads in said Primary replica and communicated by said Primary replica to said Backup replica;

wherein said means of communicating information, about claims for shared resources by threads in said Primary replica and about the order in which said claims were granted, comprises piggybacking said information on a message, multicast by said Primary replica to its Backup replicas.

56. A system for executing threads that share resources, within a computing environment that supports semi-active or passive replication of multithreaded application programs, comprising:

means for identifying requests for accesses to shared resources by threads in the Primary replica;

means for communicating to one or more Backup replicas the order in which said requests are granted to threads in said Primary replica; and means for ordering and granting requests for accesses to shared resources by threads in a Backup replica, in response to the order in which corresponding requests were granted to threads in said Primary replica and communicated by said Primary replica to said Backup replica;

wherein said means of communicating information comprises piggybacking information, about claims for shared resources by threads in first said Primary replica and about the order in which said claims were granted, on two or more messages, one message multicast by first said Primary replica to the replicas of other processes, objects or components and one message multicast by second Primary replica of said other processes, objects or components to first said Primary replica and its Backup replicas.

57. A system for executing threads that share resources, within a computing environment that supports semi-active or passive replication of multithreaded application programs, comprising:

means for identifying requests for accesses to shared resources by threads in the Primary replica;

means for communicating to one or more Backup replicas the order in which said requests are granted to threads in said Primary replica; and means for ordering and granting requests for accesses to shared resources by threads in a Backup replica, in response to the order in which corresponding requests were granted to threads in said Primary replica and communicated by said Primary replica to said Backup replica wherein lacking regular multicast messages on which to piggyback ordering information, said means for communicating is configured to multicast a control message containing information about claims for shared resources by the threads in said Primary replica and about the order in which said claims were granted.

58. A system as recited in claim 55, 56 or 57, wherein said Primary replica dictates the order in which said threads in said Backup replicas are granted access to shared resources, as communicated by said Primary replica to said Backup replicas.

59. A system as recited in claim 55, 56 or 57, wherein control programming for said means for communicating and said means for ordering and granting are contained in, or are invoked by, functions of a consistent multithreading library.

60. A system as recited in claim 59, wherein to render said application programs virtually deterministic in a transparent manner, said system employs library interpositioning to intercept calls to functions of the operating system's thread library and to direct them to said functions of said consistent multithreading library, which in turn invoke said functions of the operating system's thread library.

61. A system as recited in claim 60, further comprising dynamically linking said consistent multithreading library to said application program and interposing said consistent multithreading library ahead of said operating system's thread library.

62. A system as recited in claim 60, further comprising inserting a command into the makefile for the application program directing the linker to interpose said consistent multithreading library ahead of said operating system's thread library.

63. A system as recited in claim 60, wherein functions of said consistent multithreading library are configured as a set of functions incorporated within the operating system's thread library.

64. A system as recited in claim 55, 56 or 57, wherein said means for communicating comprises a reliable source-ordered multicast protocol which guarantees that said Backup replicas receive the messages from said Primary replica in an identical order, as multicast by said Primary replica.

65. A system as recited in claim 55, 56 or 57, wherein a shared resource comprises data configured for being shared between threads in a given replica or code sections configured for manipulating shared data or both.

66. A system as recited in claim 55, 56 or 57, wherein said shared resource is configured for being accessed by a thread utilizing a mutual exclusion construct (mutex).

67. A system as recited in claim 66, wherein a request by a thread of said Backup replica to access a mutual exclusion construct is not granted until the message from the Primary replica that contains information about the ordering and granting of said request is delivered to said Backup replica.

68. A system as recited in claim 55, 56 or 57, wherein said means for communicating to multiple replicas comprises a computing environment configured for providing reliable source-ordered multicasting of messages to Backup replicas in response to grants of requests to access shared resources by threads in said Primary replica.

69. A system as recited in claim 55, 56 or 57, wherein said means for communicating, and said means for ordering and granting, comprise functions that maintain strong replica consistency.

70. A system as recited in claim 69, wherein said means for granting accesses to shared resources to threads in a Backup replica comprises a computing environment that grants said accesses, based on the availability of said resources and on the order in which accesses to corresponding resources were granted to threads in said Primary replica and were communicated by said Primary replica and received by said Backup replica from said means for communicating.

71. A system as recited in claim 70, wherein within said Backup replica said means for ordering and granting is configured to grant a specific thread access to a specific shared resource for a specific claim if said Primary replica has previously communicated that the corresponding thread in said Primary replica has been granted access to the corresponding shared resource for the corresponding claim.

72. A system as recited in claim 71:
wherein said access to said shared resource is controlled by a mutual exclusion construct;
wherein a thread in said Backup replica is not granted said mutual exclusion construct for a given claim until said Primary replica has communicated that the corresponding thread in said Primary replica has been granted access to the corresponding shared resource for the corresponding claim.

73. A system for maintaining strong replica consistency of replicas of a multithreaded application program within a computing environment, using semi-active or passive replication, comprising:
means for communicating the order in which access to a shared resource is granted to a thread in the Primary replica; and
means for ordering and granting access to a shared resource to threads in a Backup replica in response to the order of granting access to a corresponding shared resource by a corresponding thread in said Primary replica;
wherein said means for communicating to multiple replicas comprises a computing environment configured for providing reliable source-ordered multicasting of messages to Backup replicas in response to granting of accesses of shared resources by threads in said Primary replica; and
wherein said means of communicating information, about accesses to shared resources by threads in said Primary replica and about the order in which said accesses were granted, comprises piggybacking said information on a message, multicast by said Primary replica to its own Backup replicas.

74. A system for maintaining strong replica consistency of replicas of a multithreaded application program within a computing environment, using semi-active or passive replication, comprising:
means for communicating the order in which access to a shared resource is granted to a thread in the Primary replica; and
means for ordering and granting access to a shared resource to threads in a Backup replica in response to the order of granting access to a corresponding shared resource by a corresponding thread in said Primary replica;

wherein said means for communicating to multiple replicas comprises a computing environment configured for providing reliable source-ordered multicasting of messages to Backup replicas in response to granting of accesses of shared resources by threads in said Primary replica; and wherein said means of communicating said information comprises piggybacking information, about the granting of accesses to shared resources by threads in first said Primary replica and about the order in which said accesses were granted, on two or more messages, one message multicast by first said Primary replica to the replicas of other processes, objects or components and one message multicast by second Primary replica of said other processes, objects or components to first said Primary replica and its Backup replicas.

75. A system for maintaining strong replica consistency of replicas of a multithreaded application program within a computing environment, using semi-active or passive replication, comprising:

means for communicating the order in which access to a shared resource is granted to a thread in the Primary replica; and means for ordering and granting access to a shared resource to threads in a Backup replica in response to the order of granting access to a corresponding shared resource by a corresponding thread in said Primary replica;

wherein said means for communicating to multiple replicas comprises a computing environment configured for providing reliable source-ordered multicasting of messages to Backup replicas in response to granting of accesses of shared resources by threads in said Primary replica; and wherein lacking regular multicast messages on which to piggyback ordering information, said means for communicating is configured to multicast a control message containing information about the granting of corresponding accesses to corresponding shared resources by corresponding threads in said Primary replica and about the order in which said accesses were granted.

76. A system as recited in claim 73, 74 or 75, wherein said Primary replica dictates the order in which said threads in said Backup replica are granted access to shared resources, as communicated by said means of communicating to said Backup replica.

77. A system as recited in claim 76, wherein said means for granting access to shared resources comprises a computing environment that grants said access to said shared resources, based on the availability of said shared resources and on the order in which corresponding accesses to shared resources were granted to the corresponding thread at said Primary replica and were communicated by said Primary replica and received by said Backup replica from said means for communicating.

78. A system as recited in claim 73, 74, or 75, wherein said means for determining the order in which threads can access shared resources comprises a mutual exclusion construct that is granted to a thread in response to a claim to access the resource, and which is then later released by said thread allowing said mutual exclusion construct to be claimed by other threads.

79. A system as recited in claim 78, wherein said means for communicating is configured to communicate the order in which threads in said Primary replica are granted said mutual exclusion construct.

80. A system as recited in claim 78, wherein said means for ordering and granting of accesses to threads in a Backup replica is configured to grant a mutual exclusion construct to said Backup replica as determined by the order in which the corresponding mutual exclusion construct was granted to the corresponding thread in said Primary replica, which order was communicated by said Primary replica to said Backup replica.

81. A system as recited in claim 80, wherein a thread in said Backup replica is not granted a mutual exclusion construct for a given claim until said Primary replica has communicated that the corresponding thread in said Primary replica has been granted the corresponding mutual exclusion construct to the corresponding shared resource for the corresponding claim.

82. A system as recited in claim 73, 74 or 75, wherein said means for communicating, and said means for ordering and granting, comprise functions that maintain strong replica consistency and are executed in response to calls to functions of a consistent multithreading library.

83. A system as recited in claim 82, wherein said functions of said consistent multithreading library are configured to intercept calls to corresponding functions of the operating system's thread library.

84. A system as recited in claim 83, further comprising dynamically linking said consistent multithreading library to said application program and interposing said consistent multithreading library ahead of said operating system's thread library.

85. A system as recited in claim 83, further comprising inserting a command into the makefile for the application program directing the linker to interpose said consistent multithreading library ahead of said operating system's thread library.

86. A system as recited in claim 82, wherein functions of said consistent multithreading library are configured as a set of functions incorporated within the operating system's thread library.

87. A system as recited in claim 82, wherein said functions of said consistent multithreading library comprise functions configured for claiming or releasing shared resources in a manner in which corresponding threads in different replicas are granted access to the shared resource in an identical order.

88. A system as recited in claim 73, 74 or 75, wherein said means for ordering and granting resource accesses in each said Backup replica is configured to order and grant said accesses in response to the order in which information about the claiming and granting of corresponding accesses to shared resources by corresponding threads in said Primary replica is communicated by said Primary replica to said Backup replica.

89. A system as recited in claim 73, 74 or 75, wherein said means for ordering and granting access to shared resources by threads in said Backup replica is configured to prevent said granting of shared resources until information about the claiming and granting of corresponding accesses to shared resources by corresponding threads in said Primary replica has been communicated to said Backup replica by said Primary replica.

90. A system as recited in claim 89, wherein said means for communicating to multiple replicas comprises a computing environment configured for providing reliable source-ordered multicasting of messages by said Primary replica to said Backup replicas in response to the granting of accesses to shared resources by threads in said Primary replica.

91. A system as recited in claim 90, wherein said means for ordering and granting of accesses to shared resources is configured to maintain an order of granting said accesses to threads in said Backup replicas that is identical to the order in which corresponding accesses are granted to threads in said Primary replica and are communicated to said Backup replicas by said Primary replica.

92. A system as recited in claim 73, 74 or 75, wherein said multicast messages comprise information about which shared resource is being claimed by a thread in said Primary replica, which thread is claiming the given shared resource, and which shared resource claim request of said thread is being made.

93. A system as recited in claim 73, 74 or 75:
wherein said means for communicating, and said means for ordering and granting, are configured for being executed transparently to said application program;
wherein said transparency comprises the inclusion of said means for communicating and said means for ordering and granting within said computing environment without modifying the code of said multithreaded application program.

94. A system as recited in claim 93, further comprising dynamically linking said consistent multithreading library to said application programming and interposing said consistent multithreading library ahead of said operating system's thread library.

95. A system as recited in claim 93, further comprising inserting a command into the makefile for the application program directing the linker to interpose said consistent multithreading library ahead of said operating system's thread library.

96. A system as recited in claim 93, wherein functions of said consistent multithreading library are configured as a set of functions incorporated within the operating system's thread library.

97. A system as recited in claim 73, 74 or 75, wherein said means for communicating and said means for ordering and granting are provided by interposing a consistent multithreading library ahead of said operating system's thread library and by intercepting calls of functions of said operating system's thread library and by invoking instead corresponding functions of said consistent multithreading library, which in turn invoke functions of said operating system's thread library.

98. A system as recited in claim 73, 74 or 75, wherein strong replica consistency can be maintained without the need to count the number of instructions between non-deterministic events.

99. A system as recited in claim 73, 74 or 75, wherein said computing environment comprises a client-server system or a fault-tolerant system or both.

100. A system as recited in claim 73, 74 or 75, wherein said shared resource comprises data shared between said threads in a given replica, or code for accessing said shared data in a given replica or both.

101. A system for executing a replicated multithreaded application program within a computing environment, using a semi-active or passive replication strategy, comprising:
means for granting access to shared resources to threads in a Backup replica in response to information received about the order in which access to said shared resources was granted to corresponding threads in said Primary replica; and
means for communicating the order of granting access of shared resources by the Primary replica to the Backup replicas;
wherein said means for communicating information comprises a routine configured for multicasting messages from said Primary replica to said Backup replicas in response to the granting of accesses of shared resources to threads in said Primary replica;
wherein said means for communicating information, about the order of granting accesses to shared resources, by said Primary replica to said Backup replicas, comprises piggybacking said information on a message, multicast by said Primary replica to its Backup replicas.

102. A system as recited in claim 101, wherein lacking regular multicast messages on which to piggyback ordering information, said means for communicating is configured to multicast a control message containing information about the order of granting accesses to shared resources by the Primary replica to the Backup replicas.

103. A system for executing a replicated multithreaded application program within a computing environment, using a semi-active or passive replication strategy, comprising:
means for granting access to shared resources to threads in a Backup replica in response to information received about the order in which access to said shared resources was granted to corresponding threads in said Primary replica; and
means for communicating the order of granting access of shared resources by the Primary replica to the Backup replicas;
wherein said means for communicating information comprises a routine configured for multicasting messages from said Primary replica to said Backup replicas in response to the granting of accesses of shared resources to threads in said Primary replica;
wherein said means of communicating information, about the order of granting accesses to shared resources by first said Primary replica to said Backup replicas, comprises piggybacking said information on two or more messages, one message multicast by first said Primary replica to the replicas of other processes, objects or components and one message multicast by second Primary replica of said other processes, objects or components to first said Primary replica and its Backup replicas.

104. A system as recited in claim 101 or 103, wherein said means for communicating, and said means for ordering and granting, comprise functions that maintain strong replica consistency.

105. A system as recited in claim 104, further comprising means for transparently executing said ordering and granting, and said means for communicating, without modifying the code of said application program.

106. A system as recited in claim 105, further comprising dynamically linking said consistent multithreading library to said application program and interposing said consistent multithreading library ahead of said operating system's thread library.

107. A system as recited in claim 105, further comprising inserting a command into the makefile for said application program directing the linker to interpose said consistent multithreading library ahead of said operating system's thread library.

108. A system as recited in claim 105, wherein functions of said consistent multithreading library are configured as a set of functions incorporated within the operating system's thread library.

109. A method of maintaining strong replica consistency for a replicated multithreaded application program, using the semi-active or passive replication strategy, comprising:

granting access requests for shared resources to threads in the Backup replicas in response to the order in which corresponding requests were granted to corresponding threads in the Primary replica;

wherein said granting of access requests is performed by employing library interpositioning to intercept calls to functions of the operating system's thread library;

wherein said shared resources are accessed using a mutual exclusion construct;

wherein said granting of access requests comprises;

piggybacking information, about the order of granting mutual exclusion constructs to threads in said Primary replica, onto regular messages that are multicast from said Primary replica to said Backup replicas, and delivering said messages to said Backup replicas, that determine the order in which threads in said Backup replica are granted their claims to mutual exclusion constructs;

wherein said piggybacking of information comprises piggybacking information about claims for shared resources by threads in first said Primary replica and about the order in which said claims were granted, on two or more messages, one message multicast by first said Primary replica to the replicas of other processes, objects or components and one message multicast by second Primary replica of said other processes, objects or components to first said Primary replica and its Backup replicas.

110. A method of maintaining strong replica consistency for a replicated multithreaded application program, using the semi-active or passive replication strategy, comprising:

granting access requests for shared resources to threads in the Backup replicas in response to the order in which corresponding requests were granted to corresponding threads in the Primary replica;

wherein said granting of access requests is performed by employing library interpositioning to intercept calls to functions of the operating system's thread library;

wherein said shared resources are accessed using a mutual exclusion construct;

wherein said granting of access requests comprises:

piggybacking information, about the order of granting mutual exclusion constructs to threads in said Primary replica, onto regular messages that are multicast from said Primary replica to said Backup replicas, and delivering said messages to said Backup replicas, that determine the order in which threads in said Backup replica are granted their claims to mutual exclusion constructs;

wherein if said Primary replica does not have a regular message to multicast, it multicasts a control message containing said information to said Backup replica.

111. A method as recited in claim 110, further comprising a consistent multithreading library executing said ordering and granting of access requests by intercepting calls to said operating system's thread library.

112. A method of replicating multithreaded application programs in which threads access shared resources, within a computing environment that uses semi-active or passive replication, comprising:

claiming shared resources by a thread in the Primary replica;

granting said claim to said thread in said Primary replica;

communicating to the Backup replicas the order of granting said claim; and granting the corresponding claim of a shared resource to a corresponding thread in each Backup replica, as determined by the order in which corresponding claims to shared resources were granted to corresponding threads in said Primary replica;

wherein said claiming, said communicating, and said granting are controlled by the functions of a consistent multithreading library that is interposed ahead of said operating system's thread library so that calls to functions of the operating system's thread library are intercepted to render said application program virtually deterministic;

wherein said communicating of said claim comprises piggybacking information onto regular multicast messages specifying the order in which threads in the Primary replica have been granted their claims to said mutual exclusion constructs.

113. A method as recited in claim 112, wherein said multicasting comprises piggybacking information, about claims for shared resources by threads in first said Primary replica and about the order in which said claims were granted, on two or more messages, one message multicast by first said Primary replica to the replicas of other processes, objects or components and one message multicast by second Primary replica of said other processes, objects or components to first said Primary replica and its Backup replicas.

114. A method as recited in claim 112, wherein if said Primary replica does not have a regular message to multicast, it multicasts a control message containing said order of granting information.

115. A method of replicating multithreaded application programs in which threads access shared resources, within a computing environment that uses semi-active or passive replication, comprising:

claiming shared resources by a thread in the Primary replica;

granting said claim to said thread in said Primary replica;

communicating to the Backup replicas the order of granting said claim; and granting the corresponding claim of a shared resource to a corresponding thread in each Backup replica, as determined by the order in which corresponding claims to shared resources were granted to corresponding threads in said Primary replica;

wherein said claiming, said communicating, and said granting are controlled by the functions of a consistent multithreading library that is interposed ahead of said operating system's thread library so that calls to functions of the operating system's thread library are intercepted to render said application program virtually deterministic:

wherein when said thread T of said Primary replica has been granted a mutual exclusion construct M for its Nth claim of any mutual exclusion construct, a message is multicast that contains the ordering information (T, M, N); and wherein said granting in said Backup replica comprises granting the corresponding mutual exclusion construct M to the corresponding thread T in said Backup replica for the corresponding claim N, only if said ordering information (T, M, N) from said Primary replica has been delivered to, and received by, said Backup replica.

116. A method as recited in claim 112 or 115, wherein said shared resources are accessed by using a mutual exclusion construct.

117. A method as recited in claim 115, wherein said claiming of a shared resource by a thread at said Primary replica comprises:

invoking the claim function to claim mutex M for thread T;

diverting the invocation from the claim function of the operating system's thread library to the corresponding claim function of the consistent multithreading library;

determining the information (T, M, N) for a claim to a mutual exclusion construct by a thread in the Primary replica, wherein T represents the thread making said claim, M represents the mutual exclusion construct being claimed, and N represents the claim number by thread T to access any mutual exclusion construct;

granting the mutual exclusion construct M to thread T in the Primary replica;

appending the information (T, M, N) to the queue of claims to be multicast to the Backup replicas; and multicasting messages including the piggybacked claim (T, M, N) to the Backup replicas.

118. A method as recited in claim 115, wherein said granting of a shared resource to a thread in said Backup replica comprises:

invoking the claim function to claim mutex M for thread T;

diverting the invocation from the claim function of the operating system's thread library to the corresponding claim function of the consistent multithreading library;

determining the information (T, M, N) for a claim to a mutual exclusion construct by a thread in said Backup replica, wherein T represents the thread in said Backup replica making said claim, M represents the mutual exclusion construct being claimed, and N represents the claim number by thread T to access any mutual exclusion construct;

determining if (T, M, N) matches the next grant for mutex M, as directed by said communication from said Primary replica; if so, mutex M is granted to thread T when mutex M is available; and determining that (T, M, N) does not match the next grant for mutex M, according to the order of mutex granting dictated by said Primary replica, wherein said thread T is suspended until (T, M, N) is delivered to, and received by said Backup replica, and is the next grant of mutex M in the order dictated by said Primary replica.

* * * * *